US012682729B2

(12) United States Patent
Kim et al.

(10) Patent No.: US 12,682,729 B2
(45) Date of Patent: Jul. 14, 2026

(54) ELECTRONIC DEVICE FOR GENERATING HAPTIC SIGNALS, AND METHOD THEREOF

(71) Applicant: SAMSUNG ELECTRONICS CO., LTD., Suwon-si (KR)

(72) Inventors: Baekgyeong Kim, Suwon-si (KR); Byeongnam Kim, Suwon-si (KR); Misun Kim, Suwon-si (KR); Sangheon Kim, Suwon-si (KR); Mira Seo, Suwon-si (KR); Yonggu Lee, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/769,997

(22) Filed: Jul. 11, 2024

(65) Prior Publication Data

US 2024/0362983 A1 Oct. 31, 2024

Related U.S. Application Data

(63) Continuation of application No. PCT/KR2022/016177, filed on Oct. 21, 2022.

(30) Foreign Application Priority Data

Jan. 28, 2022 (KR) ......................... 10-2022-0013684
Feb. 8, 2022 (KR) ......................... 10-2022-0016489

(51) Int. Cl.
*H04B 3/36* (2006.01)
*G06F 3/01* (2006.01)
*G08B 6/00* (2006.01)

(52) U.S. Cl.
CPC .............. *G08B 6/00* (2013.01); *G06F 3/016* (2013.01)

(58) Field of Classification Search
CPC .... G08B 6/00; G06F 3/016; H04M 1/724094; H04M 1/72442
See application file for complete search history.

(56) References Cited

U.S. PATENT DOCUMENTS 9,092,059 B2 * 7/2015 Bhatia ..................... G06F 3/016
9,437,087 B2 9/2016 Phan et al.
(Continued)

FOREIGN PATENT DOCUMENTS

EP 2 818 976 A2 12/2014
KR 10-0939623 B1 1/2010
(Continued)

OTHER PUBLICATIONS

Communication dated Nov. 18, 2024, issued by the European Patent Office in European Application No. 22790437.2.
(Continued)

*Primary Examiner* — Toan N Pham
(74) *Attorney, Agent, or Firm* — Sughrue Mion, PLLC

(57) ABSTRACT
An electronic device according to various embodiments disclosed in this document may include a haptic module including at least a motor and outputting a tactile signal; a sound output module including at least one of a speaker and a receiver; and a processor operatively connected to the haptic module and the sound output module, wherein the processor is configured to obtain audio data and a signal related to audio data reproduction; identify whether to generate haptic data based on the audio data; in response to the identification, generate haptic data based on the audio data; reproduce the audio data based on a signal related to the audio data reproduction through the sound output module; control the haptic module; and output the tactile signal based on the generated haptic data.

18 Claims, 13 Drawing Sheets

(56)                    References Cited

U.S. PATENT DOCUMENTS

| | | | |
|---|---|---|---|
| 9,588,588 B2 | 3/2017 | Israr et al. | |
| 9,619,980 B2 * | 4/2017 | Cruz-Hernandez | G10L 15/26 |
| 9,715,276 B2 | 7/2017 | Da Costa et al. | |
| 10,013,857 B2 | 7/2018 | Sridhara et al. | |
| 10,229,565 B2 | 3/2019 | Cha et al. | |
| 10,469,971 B2 | 11/2019 | Zhang et al. | |
| 10,984,637 B2 | 4/2021 | Albright et al. | |
| 11,710,389 B2 * | 7/2023 | Kim | G06F 3/01 |
| | | | 381/1 |
| 2009/0189748 A1 * | 7/2009 | Bergere | H04R 1/1091 |
| | | | 340/407.1 |
| 2014/0226068 A1 | 8/2014 | Lacroix et al. | |
| 2014/0340209 A1 | 11/2014 | Lacroix et al. | |
| 2017/0277330 A1 | 9/2017 | Bae et al. | |
| 2018/0011538 A1 | 1/2018 | Rihn et al. | |
| 2018/0315343 A1 * | 11/2018 | Shvartzberg | G09B 21/009 |
| 2019/0286235 A1 | 9/2019 | Gautama | |
| 2021/0375105 A1 | 12/2021 | Kim et al. | |
| 2022/0155869 A1 | 5/2022 | Amadio | |

FOREIGN PATENT DOCUMENTS

| | | | |
|---|---|---|---|
| KR | 10-2012-0126446 A | 11/2012 | |
| KR | 10-2015-0092671 A | 8/2015 | |
| KR | 10-2018-0062174 A | 6/2018 | |
| KR | 10-2019-0017010 A | 2/2019 | |
| KR | 10-2020-0102784 A | 9/2020 | |
| KR | 10-2204606 B1 | 1/2021 | |
| KR | 10-2212409 B1 | 2/2021 | |
| KR | 10-2254705 B1 | 5/2021 | |
| WO | 2020/165746 A1 | 8/2020 | |
| WO | 2020 176383 A1 | 9/2020 | |

OTHER PUBLICATIONS

International Search Report (PCT/ISA/210) issued on Jan. 30, 2023 by the International Searching Authority in International Application No. PCT/KR2022/016177.

Written Opinion (PCT/ISA/237) issued on Jan. 30, 2023 by the International Searching Authority in International Application No. PCT/KR2022/016177.

Communication dated Feb. 28, 2026 issued by the Korean Ministry of Intellectual Property in Korean Patent Application No. 10-2022-0016489.

* cited by examiner

ELECTRONIC DEVICE FOR GENERATING HAPTIC SIGNALS, AND METHOD THEREOF

CROSS-REFERENCE TO RELATED APPLICATIONS

This application is a continuation application of International Application No. PCT/KR2022/016177 designating the United States, filed on Oct. 21, 2022, in the Korean Intellectual Property Receiving Office and claiming priority to Korean Patent Application No. 10-2022-0013684, filed on Jan. 28, 2022, and of a Korean patent application number 10-2022-0016489, filed on Feb. 8, 2022, in the Korean Intellectual Property Office, the disclosure of each of which is incorporated by reference herein in its entirety.

TECHNICAL FIELD

Various embodiments disclosed in this document relate to an electronic device generating a haptic signal and to a method for the electronic device to generate a haptic signal and output the generated haptic signal.

BACKGROUND ART

An electronic device may generate a visual effect, an auditory effect, and/or a tactile effect (a haptic signal, a tactile signal) to notify a user of a designated event. For example, the user may operate a function related to content displayed on the touch screen of the electronic device. In connection with the user's manipulation of content, the electronic device may generate a tactile signal, for example, a vibration effect. Accordingly, the user may feel realistic feedback in relation to content manipulation. Recently, various technologies for providing a rich user experience by reproducing tactile signals in response to media content have been developed.

DISCLOSURE OF INVENTION

Technical Problem

In order for conventional electronic devices (e.g., smartphone, tablet PC) to reproduce a tactile signal coupled with media content (e.g., an audio), media data must be directly transmitted to a hardware module (e.g., a haptic module) included in the electronic device. In this case, an additional hardware resource (e.g., an interface) has been required to transmit the direct media data from a hardware module (e.g., an audio module) for media reproduction to a hardware module for a tactile signal reproduction in order to reproduce for the user a tactile signal with a suitable specification or high quality. In this case, an additional space for arranging an additional hardware resources in the electronic device is required, which may cause deterioration in portability of the electronic device and an increase in production costs. On the other hand, in the case that a simple tactile signal is generated and reproduced without such an additional hardware resources, the quality of the tactile signal may deteriorate.

Solution to Problem

An electronic device according to various embodiments disclosed in this document may include a haptic module including at least a motor and outputting a tactile signal; a sound output module including at least one of a speaker and a receiver; and a processor operatively connected to the haptic module and the sound output module, wherein the processor is configured to obtain audio data and a signal related to audio data reproduction; identify whether to generate haptic data based on the audio data; in response to the identification, generate haptic data based on the audio data; reproduce the audio data based on a signal related to the audio data reproduction through the sound output module; control the haptic module; and output the tactile signal based on the generated haptic data.

A method for providing an output of a tactile signal by an electronic device according to various embodiments disclosed in this document may comprise obtaining audio data and a signal related to audio data reproduction; identifying whether to generate haptic data based on the audio data; in response to the identification, generating haptic data based on the audio data; and outputting the tactile signal based on the generated haptic data.

Advantageous Effects of Invention

According to various embodiments, an improved tactile signal having high usability may be provided to the user without an additional hardware resources.

According to various embodiments, by generating and reproducing a tactile output in connection with the media content, it is possible to increase the user experience of the media content.

BRIEF DESCRIPTION OF DRAWINGS

With respect to the description of the drawings, the same or similar reference numerals may be used for the same or similar components.

FIG. 1 is a block diagram illustrating an electronic device in a network environment according to various embodiments.

FIG. 10 illustrates haptic data generated by an electronic device using media data according to various embodiments.

MODE FOR THE INVENTION

Figure 1:
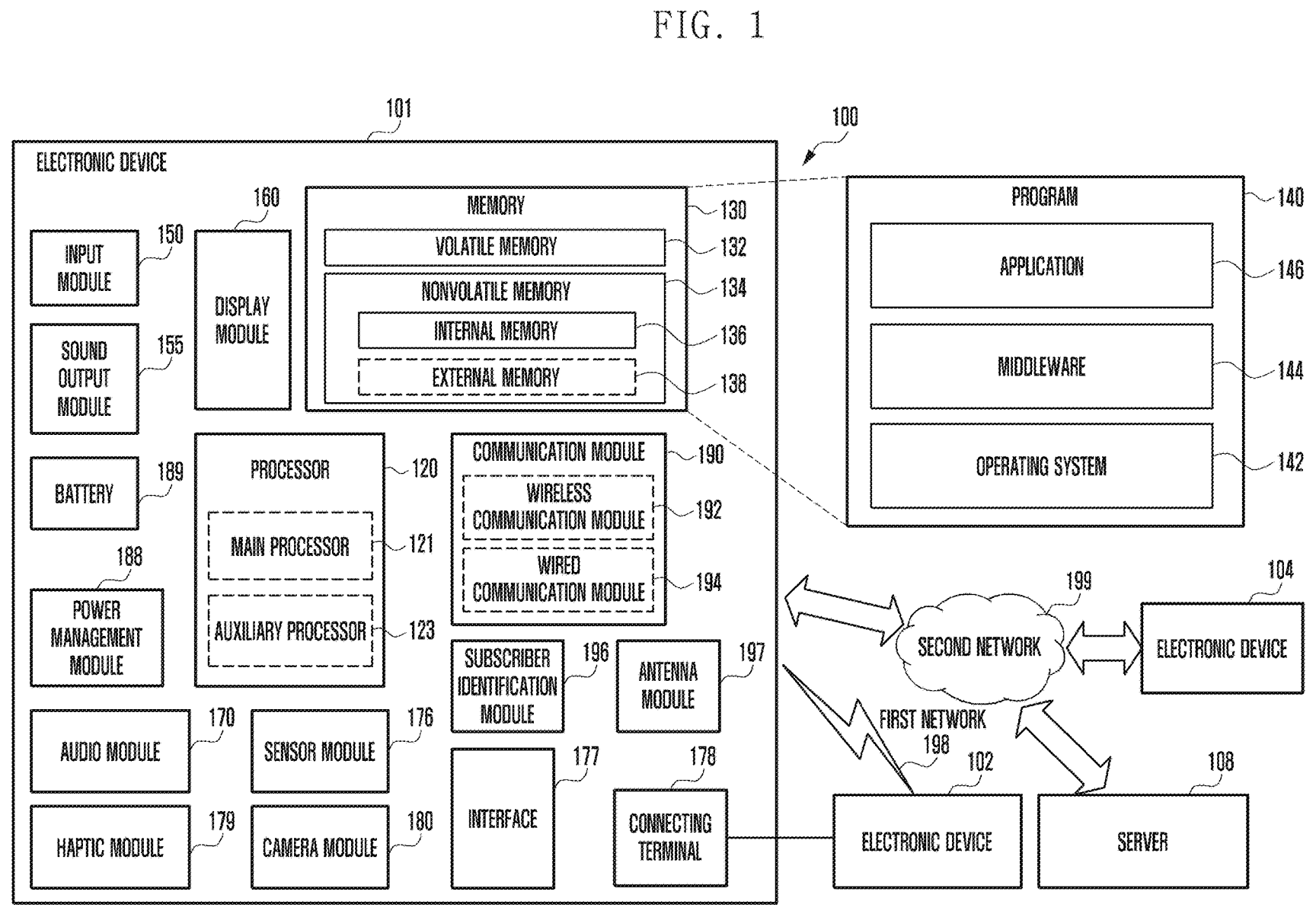
Figure 2:
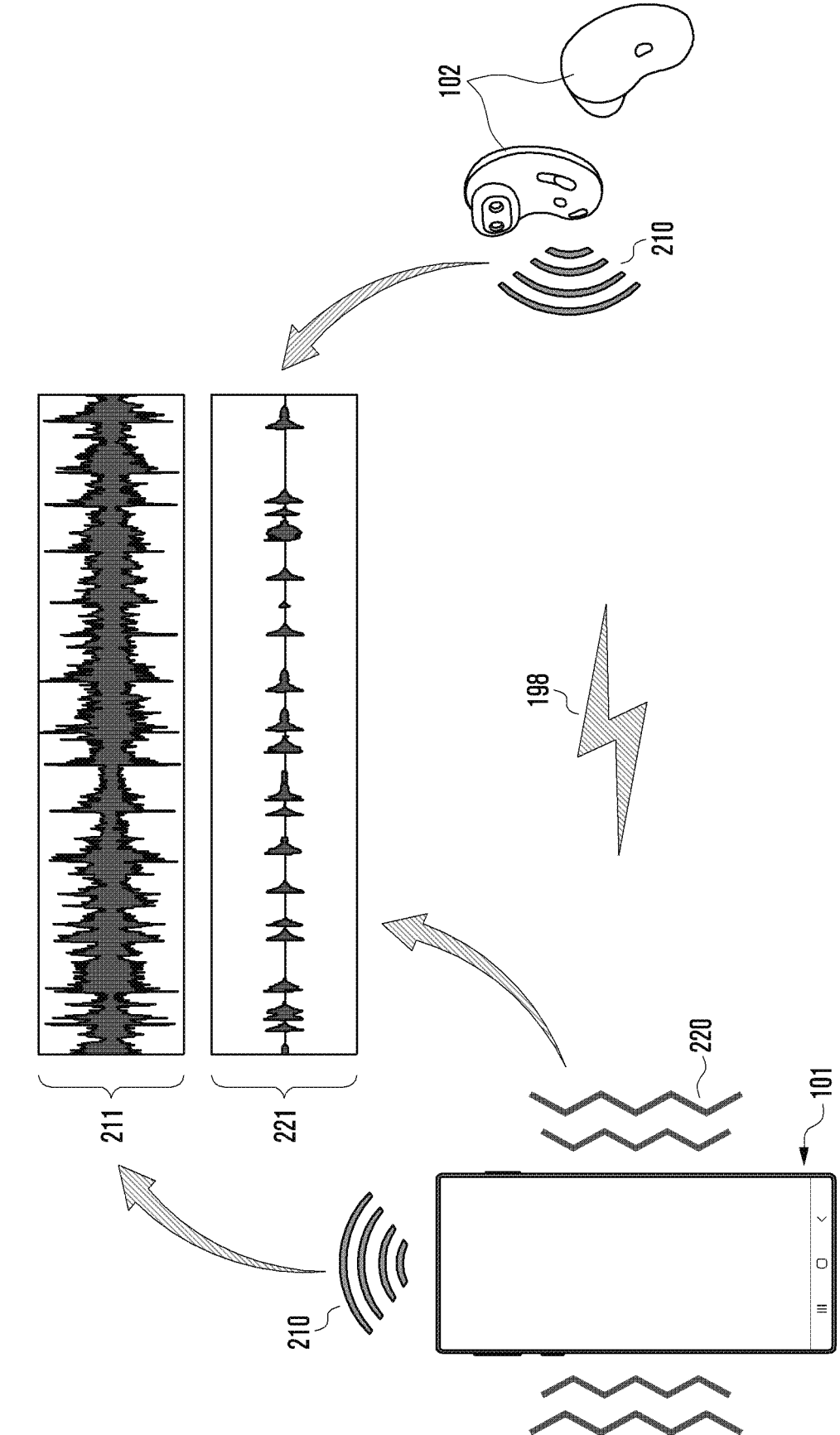
FIG. 2 is an exemplary diagram in which an electronic device generates and outputs a tactile signal simultaneously with the output of audio data, according to various embodiments.

FIG. 1 is a block diagram illustrating an electronic device 101 in a network environment 100 according to various embodiments. With reference to FIG. 1, the electronic device 101 in the network environment 100 may communicate with an electronic device 102 via a first network 198 (e.g., a short-range wireless communication network) or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing operations or computations. According to an embodiment, as at least part of the data processing operations or computations, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, in the case that the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101, where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network or a combination of two or more thereof but it is not limited thereto. The artificial intelligence model may, additionally or alternatively, include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing a recording. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board or adjacent to the first surface and capable of supporting a designated high-frequency band (e.g., the mm Wave band), and a plurality of antennas (e.g., array antennas) disposed on a second surface (e.g., the top or a side surface) of the printed circuit board or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic device 102 or 104 may be a device of the same type as, or a different type from, the electronic device 101. According to an embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is an exemplary diagram in which the electronic device 101 generates and outputs a tactile signal simultaneously with the output of audio data, according to various embodiments.

With reference to FIG. 2, the electronic device 101 (e.g., the electronic device 101 of FIG. 1) may reproduce media data (e.g., audio data 211 and haptic data 221). Media data may be data for outputting a visual signal, an auditory signal, a tactile signal, or a combination thereof. For example, media data may include audio data 211 and haptic data 221. According to various embodiments, the electronic device 101 may reproduce the audio data 211 and output the audio signal 210. According to an embodiment, the electronic device 101 may generate the audio data 211, read the data previously stored in the memory (e.g., the memory 130 of FIG. 1), or obtain the audio data 211 by receiving the data from another external electronic device through a network (e.g., the first network 198 or the second network 199 of FIG. 1). According to an embodiment, the audio data 211 may include an electrical signal including a digital signal, and the electronic device 101 may convert the audio data 211 into the audio signal 210 and output the converted audio signal 210. According to various embodiments, the electronic device 101 may output a tactile signal 220 (a haptic signal). The tactile signal 220 is a signal that allows a user to feel tactile, for example, vibration, force, impact, texture, temperature, or a combination thereof. Based on the haptic data 221, the electronic device 101 may output a tactile signal 220 including one or more vibration conditions (e.g., vibration frequency, vibration duration, vibration intensity, vibration waveform, or vibration position). According to an embodiment, the haptic data 221 may include an electrical signal including a digital signal, and the electronic device 101 may convert the haptic data 221 into the tactile signal 220 and output the converted the tactile signal 220 to the outside.

According to various embodiments, the electronic device 101 may be connected to the network 198 (e.g., the first network 198 of FIG. 1) and communicate wirelessly with the external electronic device 102 (e.g., the electronic device 102 of FIG. 1). According to various embodiments, the electronic device 101 may control the external electronic device 102 through the network 198. According to an embodiment, the electronic device 101 may output the audio signal 210 using the external electronic device 102. According to an embodiment, the electronic device 101 may transmit a control signal including the audio data 211 to the external electronic device 102. According to an embodiment, the electronic device 101 may transmit a control signal that enables the external electronic device 102 to convert the transmitted audio data 211 into the audio signal 210 and output the converted audio data 210 to the outside. According to an embodiment, the external electronic device 102 may output the audio signal 210. The external electronic device 102 may receive the audio data 211 from the electronic device 101 through the network 198, convert the received audio data 211 into an audio signal 210, and output the data to the outside.

According to various embodiments, the electronic device 101 may generate the haptic data 221 based on the audio data 211. According to an embodiment, the audio data 211 and/or the haptic data 221 may include an electrical signal including a digital signal. According to an embodiment, the audio data 211 and/or the haptic data 221 may include data expressed by a pulse code modulation (PCM) method. According to an embodiment, the electronic device 101 may generate the haptic data 221 based on the audio data 211. The electronic device 101 may generate the haptic data 221 by analyzing one or more parameters (e.g., frequency, duration, amplitude, or waveform) included in the audio data 211. The electronic device 101, in order to generate the haptic data 221 based on the audio data 211, may modulate by changing the characteristics such as the amplitude and/or the frequency of the audio data 211, or may use various techniques such as sampling and/or filtering. According to an embodiment, the electronic device 101 may store a library containing data pertaining to one or more vibration waveforms in a memory (e.g., the memory 130 of FIG. 1) and may generate the haptic data 221 by combining haptic signals of corresponding waveforms based on audio data 211. The audio data 211 and/or the haptic data 221 generated based on the audio data 211 may include one or more markers for synchronization with each other. The electronic device 101 may generate the haptic data 221 by including one or more markers in the case of generating the haptic data 221. According to an embodiment, the audio data 211 may be data including the haptic data 221 in advance. For example, audio data for outputting an audio signal and haptic data for outputting a tactile sense may be integrated in one piece of data (e.g., the integrated audio data). The integrated audio data containing the haptic data 221 may include data in a format in which at least a portion of the audio data 211 and at least a portion of the haptic data 221 are connected and intersected in time order. For example, the integrated audio data may be in a format in which the audio data 211 is divided into frame units, the corresponding haptic data 221 is also divided into the same frame units, and both are integrated to intersect each other. According to an embodiment, the electronic device 101 may generate the integrated audio data by integrating the audio data 211 and the haptic data 221. The electronic device 101 may generate integrated audio data by connecting at least a portion of the audio data 211 and at least a portion of the haptic data 221 through corresponding and intersecting in time order. For example, the electronic device 101 may generate the integrated audio data by dividing the audio data 211 into frame units and also dividing the corresponding haptic data 221 into the same frame units, and integrating so that audio data and haptic data can intersect each other in time order.

According to various embodiments, the electronic device 101 may output the audio signal 210 and the tactile signal 220 substantially simultaneously. According to an embodiment, the electronic device 101 may output an audio signal 210 and a tactile signal 220 based on the audio data 211 and the haptic data 221 generated by the electronic device 101 based on the audio data 211. According to an embodiment, the electronic device 101 may synchronize the audio data 211 and the haptic data 221 and may substantially simultaneously output the audio signal 210 and the tactile signal 220 corresponding to each other. According to an embodiment, the electronic device 101 may synchronize and reproduce the audio data 211 and the haptic data 221 based on one or more markers included in the audio data 211 and/or the haptic data 221.

Figure 3:
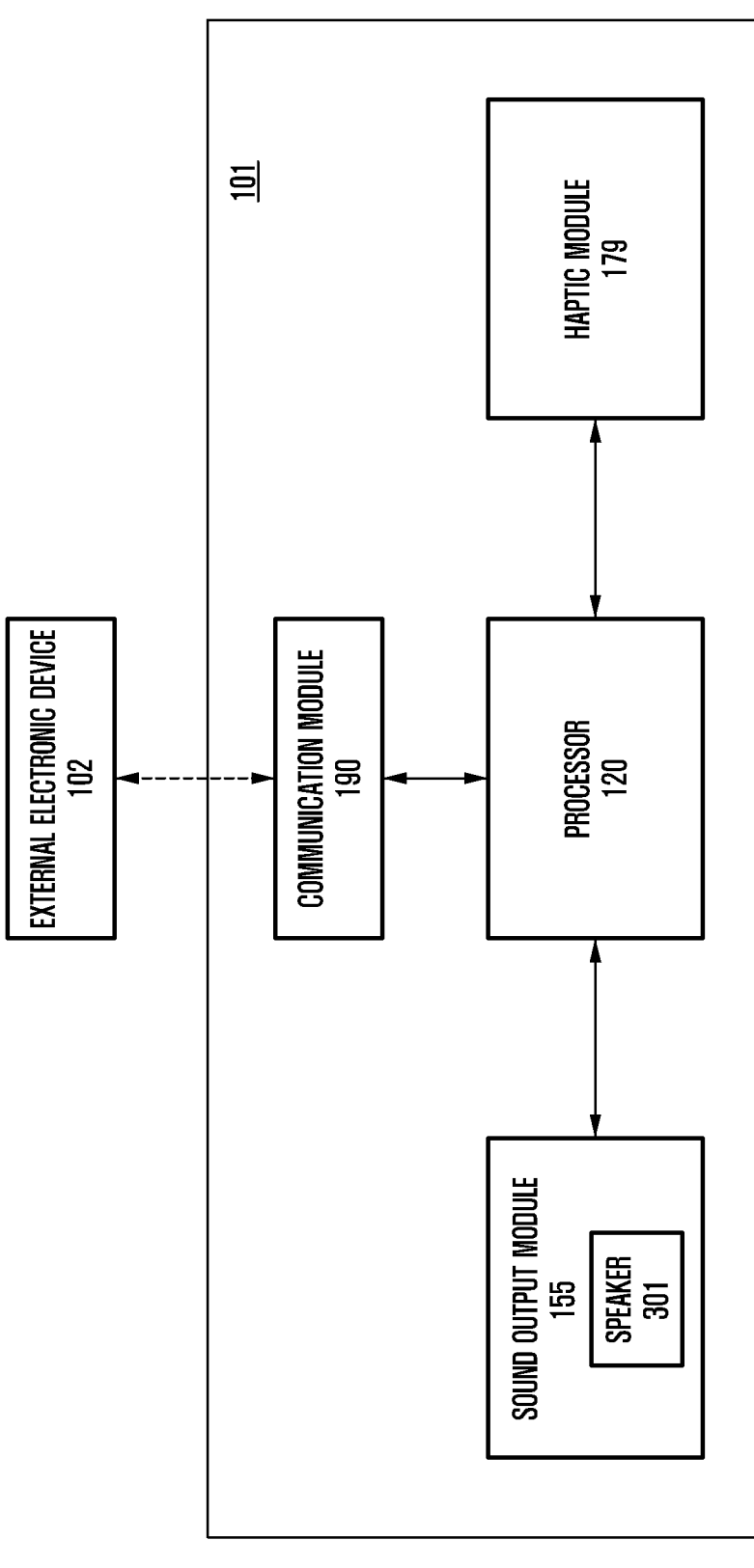
FIG. 3 is a block diagram of an electronic device according to various embodiments.

FIG. 3 is a block diagram of an electronic device according to various embodiments.

With reference to FIG. 3, an electronic device (e.g., the electronic device 101 of FIG. 1 and the electronic device 101 of FIG. 2) may include a processor 120, a sound output module 155, and a haptic module 179 and/or a communication module 190; and, even if at least part of the illustrated components are omitted or substituted, there will be no hindrance to implementing various embodiments disclosed in this document. The electronic device 101 according to various embodiments may include all or part of the configurations and/or functions of the electronic device 101 of FIG. 1 and/or the electronic device 101 of FIG. 2.

According to various embodiments, the communication module 190 may form a communication connection with various electronic devices (e.g., the electronic device 102 of FIG. 1 or the external electronic device 102 of FIG. 2). The communication module 190 may include at least a part of functions and/or configurations of the communication module 190 of FIG. 1. According to various embodiments, the communication module 190 may support short-range wireless communication (e.g., the first network 198 of FIG. 1 or the network 198 of FIG. 2) and may form a connection with an external electronic device (e.g., the external device 102 of FIG. 2) using short-range wireless communication. According to an embodiment, the electronic device 101 may be connected to an external electronic device (e.g., the external electronic device 102 of FIG. 2) using short-range wireless communication such as Bluetooth, BLE (bluetooth low energy), and/or Wi-Fi (wireless fidelity). According to an embodiment, the electronic device 101 may be connected to the external electronic device 102 using short-range wireless communication, control the operation of the external electronic device 102, and receive data from the external electronic device 102 or transmit various types of information including data for controlling the external electronic device to the external electronic device 102. For example, the electronic device 101 may transmit audio data (e.g., the audio data 211 of FIG. 2) to the external electronic device 102 and control output of the audio signal (e.g., the audio signal 210 of FIG. 2) to the outside based on the transmitted audio data 211.

According to various embodiments, the sound output module 155 may output a voice to the outside of the electronic device 101 using the speaker 301. The sound output module 155 may include at least a part of the configuration and/or functions of the sound output module 155 of FIG. 1. The sound output module 155 may convert a digital audio signal (e.g., the audio data 211 of FIG. 2) into an analog audio signal, and output the converted analog audio signal to the outside using the speaker 301. The sound output module 155 may receive a digital audio signal (e.g., the audio data 211 of FIG. 2) from another component (e.g., the processor 120) of the electronic device 101 and output an audio signal corresponding thereto to the outside.

According to various embodiments, the haptic module 179 may generate various tactile effects that the user can feel. According to an embodiment, the tactile effect generated by the haptic module 179 may include a vibration effect, the effect of stimulation by a pin arrangement moving perpendicular to the contact skin surface, the effect of the stimulation rubbing the skin surface, the effect of stimulation through the contact of electrodes, and/or the effect of stimulation using electrostatic force. In the case that the haptic module 179 generates vibration as a tactile effect, the intensity and pattern of the vibration generated by the haptic module 179 may be converted, and the haptic module 179 may synthesize and output, or output sequentially, the different vibrations. The haptic module 179 may not only deliver the tactile effect through direct contact, but it may also be implemented so that the tactile effect can be felt through a kinesthetic sense of the user's finger or arm. According to an embodiment, the haptic module 179 may include, for example, a motor, a piezoelectric element, or an electrical stimulation device. According to an embodiment, the haptic module 179 may include at least one vibration motor, at least one ultrasonic motor, at least one piezo actuator, or at least one linear resonant actuator (LRA). According to an embodiment, the haptic module 179 may convert a digital haptic signal (e.g., the haptic data 221 of FIG. 2) into an analog tactile signal (e.g., vibration) and output the converted analog tactile signal to the outside. The haptic module 179 may receive a digital haptic signal (e.g., the haptic data 221) from another component (the processor 120) of the electronic device 101 and output a tactile signal corresponding thereto to the outside.

According to various embodiments, the processor 120 may process an arithmetic operation or data related to control and/or communication of each component of the electronic device 101. The processor 120 may include at least part of the configuration and/or functions of the processor 120 of FIG. 1. The processor 120 may be connected operatively, electrically, and/or functionally with components of the electronic device 101, such as the communication module 190, the sound output module 155, and the haptic module 179. There will be no limitation on the type and/or amount of arithmetic operations, calculations, and data processing that the processor 120 can perform, but in this document, only the configuration and function of the processor 120, related to a method for outputting a tactile signal and an audio signal substantially simultaneously according to various embodiments and the operation of performing the method, will be explained.

According to various embodiments, the processor 120 may obtain audio data (e.g., the audio data 211 of FIG. 2). According to an embodiment, the electronic device 101 may generate the audio data, read the data previously stored in the memory (e.g., the memory 130 of FIG. 1), or obtain the audio data 211 by receiving the data from another external electronic device through a network (e.g., the first network 198 or the second network 199 of FIG. 1). The audio data obtained by the processor 120 may include data for repro-ducing and outputting an audio signal. For example, the sound output module 155 may include digital data to be converted into an analog audio signal and outputted to the outside. According to an embodiment, the audio data obtained by the processor 120 may include integrated audio data containing the haptic data. The integrated audio data may include the data in a format in which at least a portion of the audio data and at least a portion of the haptic data are connected and intersected in time order.

According to various embodiments, the processor 120 may obtain a signal related to audio reproduction. Signals related to audio reproduction may include a signal for controlling the electronic device 101 to reproduce audio data and output an audio signal to the outside. For example, the signal related to the audio reproduction may include a signal for starting the reproduction of the audio signal. According to an embodiment, the processor 120 may generate a signal related to audio reproduction based on an input received from the external source (e.g., the user). The processor 120 may receive an external command or data through the input module (e.g., the input module 150 of FIG. 1) and generate a signal for reproduction. According to an embodiment, the processor 120 may obtain a signal related to the audio reproduction by a running application. The processor 120 may obtain a signal generated by the running application as a signal related to audio reproduction. According to an embodiment, the processor 120 may reproduce audio data based on the obtained audio reproduction signal.

According to various embodiments, the processor 120 may identify whether to generate haptic data based on audio data. According to an embodiment, the processor 120 may identify whether to generate audio data-based haptic data based on the obtained audio data. For example, in the case that the obtained audio data is the integrated audio data, the processor 120 may identify that the haptic data based on the audio data is not generated because the audio data already includes the haptic data. According to an embodiment, the processor 120 may check the audio data and identify whether obtained audio data is integrated data, that is, the data that includes the haptic data. According to an embodi-ment, the processor 120 may identify whether to generate audio data-based haptic data based on a user input received from the outside. According to an embodiment, the proces-sor 120 may identify whether to generate haptic data based on the running application.

According to various embodiments, the processor 120 may generate audio data-based haptic data. According to various embodiments, the processor 120 may generate hap-tic data based on the audio data. According to an embodi-ment, audio data and/or the haptic data may include an electrical signal including a digital signal. According to an embodiment, audio data and/or the haptic data may include data expressed in a pulse code modulation (PCM) method. According to an embodiment, the processor 120 may gen-erate haptic data based on the audio data. The processor 120 may generate haptic data by analyzing one or more data parameters (e.g., frequency, duration, amplitude, or wave-form) that are included in the audio data. The processor 120, in order to generate the haptic data based on the audio data, may modulate by changing the characteristics such as the amplitude and/or frequency of the audio data or may use various techniques such as sampling and/or filtering. According to an embodiment, the processor 120 may store a library containing data pertaining to one or more vibration waveforms in a memory (e.g., the memory 130 of FIG. 1) and may generate the haptic data by combining haptic signals of corresponding waveforms based on audio data. The audio data and/or the haptic data generated based on the audio data may include one or more markers for synchro-nization with each other. The processor 120 may generate the haptic data by including one or more markers in the case of generating the haptic data. According to an embodiment, the audio data may be data including the haptic data in advance. For example, audio data for outputting an audio signal and haptic data for outputting a tactile sense may be integrated in one piece of data (e.g., the integrated audio data). The integrated audio data containing the haptic data may include the data in a format in which at least a portion of the audio data 211 and at least a portion of the haptic data are connected and intersected in time order. For example, the integrated audio data may be in a format in which the audio data is divided into frame units, the corresponding haptic data is also divided into the same frame unit, and both are integrated to intersect each other. According to an embodi-ment, the processor 120 may generate the integrated audio data by integrating the audio data and the haptic data. The processor 120 may generate integrated audio data by con-necting at least a portion of the audio data and at least a portion of the haptic data through corresponding and inter-secting in time order. For example, the processor 120 may generate the integrated audio data by dividing the audio data into frame units and also dividing the corresponding haptic data into the same frame units, and integrating so that audio data and haptic data can intersect each other in time order.

According to various embodiments, the processor 120 may post-process the generated haptic data. According to an embodiment, the processor 120 may extract characteristic information of the audio data. The characteristic information of the audio data may include at least one of waveform of audio data, amplitude, frequency, and duration or a combi-nation thereof. According to an embodiment, the character-istic information of the audio data may include the data resulting from processing the audio data. For example, there may be the audio data filtered using a specified filter or the audio data from which noise has been removed. According to an embodiment, the processor 120 may extract charac-teristic information of the audio data based on data obtained by modulating the audio data based on a specified algorithm. According to an embodiment, the processor 120 may control the haptic module 179 and post-process the haptic data based on characteristic information of the audio data. According to an embodiment, the processor 120 may post-process the haptic data based on the characteristic informa-tion of the extracted audio data. According to an embodi-ment, the processor 120 may extract characteristic information of the generated haptic data. The characteristic information of the haptic data may include at least one of waveform of haptic data, amplitude, frequency, and duration or a combination thereof. The processor 120 may post-process the haptic data based on the characteristic information of the haptic data. According to an embodiment, the processor 120 may post-process the haptic data by filtering or modulating and correcting the haptic data.

According to various embodiments, the processor 120 may reproduce the audio data. The processor 120 may reproduce the audio data and output the audio signal 210. According to an embodiment, the processor 120 may control the sound output module 155, convert the obtained audio data into an audio signal that is an analog signal, and output it to the outside. According to various embodiments, the processor 120 may output a tactile signal based on the haptic data. The tactile signal may include a signal that allows the user to feel tactile, for example, vibration, force, impact, texture, temperature, or a combination thereof. The processor 120 may output a tactile signal that includes one or more vibration conditions (e.g., vibration frequency, vibration duration, vibration intensity, vibration waveform, or vibration position) based on the haptic data. According to an embodiment, the processor 120 may control the haptic module 179, convert the haptic data into an analog tactile signal, and output to the outside. According to various embodiments, the processor 120 may output an audio signal and a tactile signal substantially simultaneously. According to an embodiment, the processor 120 may output the audio signal and the tactile signal based on the audio data and the haptic data that the electronic device 101 generates based on the audio data. According to an embodiment, the processor 120 may output substantially simultaneously the audio signal and the tactile signal that correspond to each other by synchronizing the audio data and the haptic data. According to an embodiment, the processor 120 may synchronize and reproduce the audio data and the haptic data based on one or more markers included in the audio data and/or the haptic data.

Figure 4:
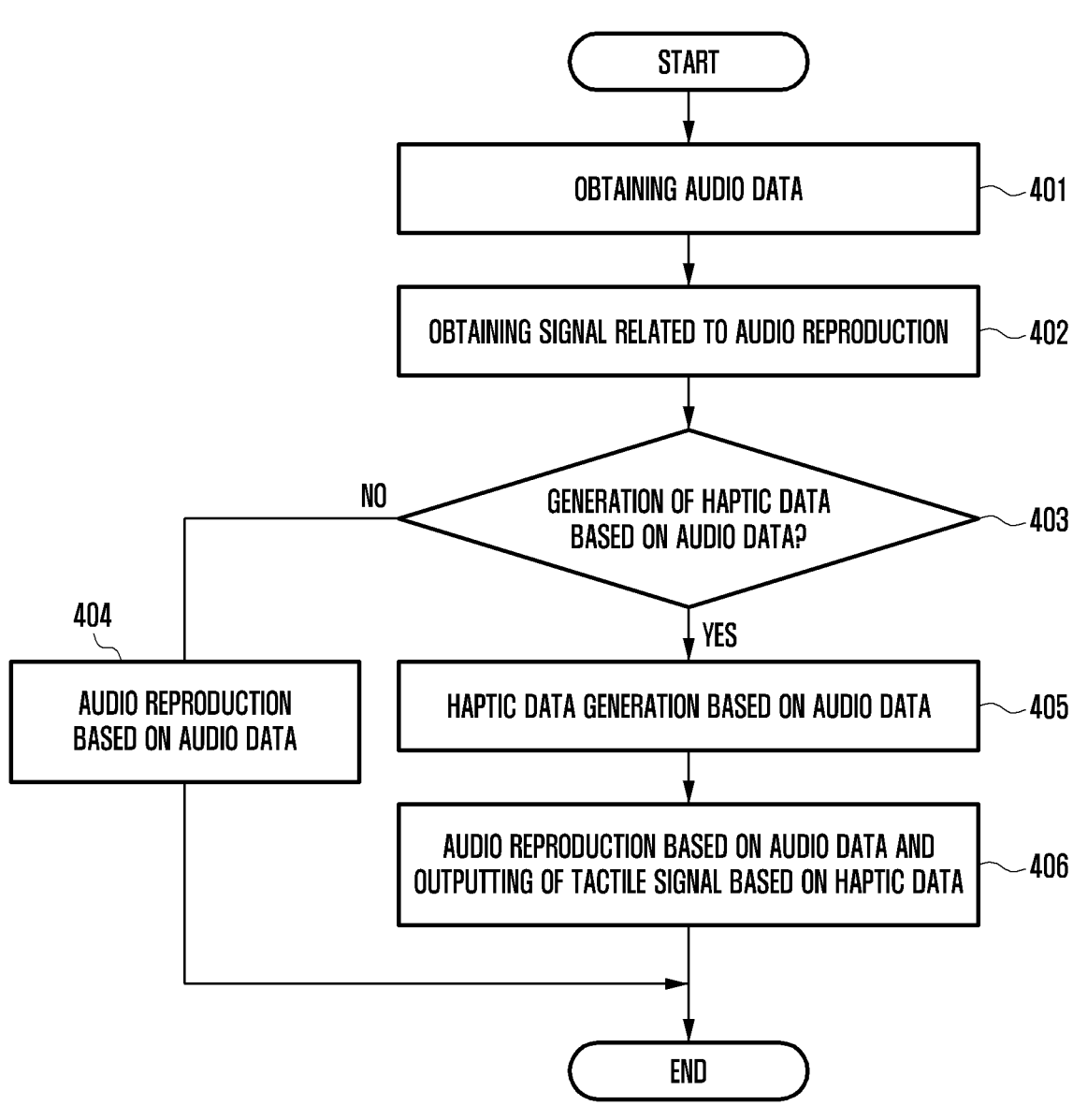
FIG. 4 is a flowchart illustrating an operation in which an electronic device outputs a tactile signal according to various embodiments.

FIG. 4 is a flowchart illustrating an operation in which an electronic device outputs a tactile signal according to various embodiments.

With reference to FIG. 4, each operation of the electronic device (e.g., the electronic device 101 of FIG. 1, the electronic device 101 of FIG. 2, and the electronic device 101 of FIG. 3) that outputs a tactile signal may be understood as an operation performed by the processor (the processor 120 of FIG. 3) of the electronic device 101. The order of each operation in FIG. 4 may be changed with each other and there may be a change or substitution of each operation and/or addition of some operations.

With reference to operation 401, the processor 120 may obtain audio data. According to various embodiments, the processor 120 may obtain audio data (e.g., the audio data 211 of FIG. 2). According to an embodiment, the electronic device 101 may generate the audio data, read the data previously stored in the memory (e.g., the memory 130 of FIG. 1), or obtain the audio data 211 by receiving the data from another external electronic device through a network (e.g., the first network 198 or the second network 199 of FIG. 1). The audio data obtained by the processor 120 may include data for reproducing and outputting an audio signal. For example, the sound output module (e.g., the sound output module 155 of FIG. 3) may include digital data to be converted into an analog audio signal and outputted to the outside. According to an embodiment, the audio data obtained by the processor 120 may include integrated audio data containing the haptic data. The integrated audio data may include the data in a format in which at least a portion of the audio data and at least a portion of the haptic data are connected and intersected in time order.

With reference to operation 402, the processor 120 may obtain a signal related to audio reproduction. Signals related to audio reproduction may include a signal for controlling the electronic device 101 to reproduce audio data and output an audio signal to the outside. For example, the signal related to the audio reproduction may include a signal for starting the reproduction of the audio signal. According to an embodiment, the processor 120 may generate a signal related to audio reproduction based on an input received from the outside (e.g., the user). The processor 120 may receive an external command or data through the input module (e.g., the input module 150 of FIG. 1) and generate a signal for reproduction. According to an embodiment, the processor 120 may obtain a signal related to the audio reproduction by a running application. The processor 120 may obtain a signal generated by the running application as a signal related to audio reproduction. According to an embodiment, the processor 120 may reproduce audio data based on the obtained audio reproduction signal.

With reference to operation 403, the processor 120 may identify whether to generate haptic data based on audio data. According to an embodiment, the processor 120 may identify whether to generate audio data-based haptic data based on the obtained audio data. For example, in the case that the obtained audio data is the integrated audio data, the processor 120 may identify that the haptic data based on the audio data is not generated because the audio data already includes the haptic data. According to an embodiment, the processor 120 may check the audio data and identify whether obtained audio data is integrated data, that is, the data that includes the haptic data. According to an embodiment, the processor 120 may identify whether to generate audio data-based haptic data based on a user input received from the outside. According to an embodiment, the processor 120 may identify whether to generate haptic data based on the running application. The processor 120 may proceed to operation 405 in the case of generating the haptic data based on the audio data as a result of the identification. Or, the processor 120 may proceed to operation 404 in the case of not generating the haptic data based on the audio data as a result of identification.

With reference to operation 404, the processor 120 may reproduce an audio based on the audio data. The processor 120 may reproduce the audio data obtained in response to a signal related to an audio reproduction without generating the haptic data based on the audio data. According to an embodiment, the processor 120 may convert the audio data obtained by controlling the sound output module 155 into an audio signal that is an analog signal, and output the converted audio signal to the outside.

With reference to operation 405, the processor 12 may generate the haptic data based on the audio data. According to various embodiments, the processor 120 may generate audio data-based haptic data. According to various embodiments, the processor 120 may generate haptic data based on the audio data. According to an embodiment, audio data and/or the haptic data may include an electrical signal including a digital signal. According to an embodiment, audio data and/or the haptic data may include data expressed in a pulse code modulation (PCM) method. According to an embodiment, the processor 120 may generate haptic data based on the audio data. The processor 120 may generate haptic data by analyzing one or more data parameters (e.g., frequency, duration, amplitude, or waveform) that are included in the audio data. The processor 120, in order to generate the haptic data based on the audio data, may modulate by changing the characteristics such as the amplitude and/or frequency of the audio data or may use various techniques such as sampling and/or filtering. According to an embodiment, the processor 120 may store a library containing data pertaining to one or more vibration waveforms in a memory (e.g., the memory 130 of FIG. 1) and may generate the haptic data by combining haptic signals of corresponding waveforms based on audio data. The audio data and/or the haptic data generated based on the audio data may include one or more markers for synchronization with each other. The processor 120 may generate the haptic data by including one or more markers in the case of generating the haptic data. According to an embodiment, the audio data may be data including the haptic data in advance. For example, audio data for outputting an audio signal and haptic data for outputting a tactile sense may be integrated in one piece of data (e.g., the integrated audio data). The integrated audio data containing the haptic data may include the data in a format in which at least a portion of the audio data 211 and at least a portion of the haptic data are connected and intersected in time order. For example, the integrated audio data may be in a format in which the audio data is divided into frame units, the corresponding haptic data is also divided into the same frame unit, and both are integrated to intersect each other. According to an embodiment, the processor 120 may generate the integrated audio data by integrating the audio data and the haptic data. The processor 120 may generate integrated audio data by connecting at least a portion of the audio data and at least a portion of the haptic data through corresponding and intersecting in time order. For example, the processor 120 may generate the integrated audio data by dividing the audio data into frame units and also dividing the corresponding haptic data into the same frame units, and integrating so that audio data and haptic data can intersect each other in time order.

With reference to operation 406, the processor 120 may reproduce the audio based on the audio data and output the tactile signal based on the haptic data. According to various embodiments, the processor 120 may reproduce the audio. The processor may reproduce the audio data and output the audio signal 210. According to an embodiment, the processor 120 may control the sound output module 155, convert the obtained audio data into an audio signal that is an analog signal, and output it to the outside. According to various embodiments, the processor 120 may output a tactile signal based on the haptic data. The tactile signal may include a signal that allows the user to feel tactile, for example, vibration, force, impact, texture, temperature, or a combination thereof. The processor 120 may output a tactile signal that includes one or more vibration conditions (e.g., vibration frequency, vibration duration, vibration intensity, vibration waveform, or vibration position) based on the haptic data. According to an embodiment, the processor 120 may control the haptic module 179, convert the haptic data into an analog tactile signal, and output to the outside. According to various embodiments, the processor 120 may output an audio signal and a tactile signal substantially simultaneously. According to an embodiment, the processor 120 may output the audio signal and the tactile signal based on the audio data and the haptic data that the electronic device 101 generates based on the audio data. According to an embodiment, the processor 120 may output simultaneously the audio signal and the tactile signal that correspond to each other by synchronizing the audio data and the haptic data. According to an embodiment, the processor 120 may synchronize and reproduce the audio data and the haptic data based on one or more markers included in the audio data and/or the haptic data.

Figure 5:
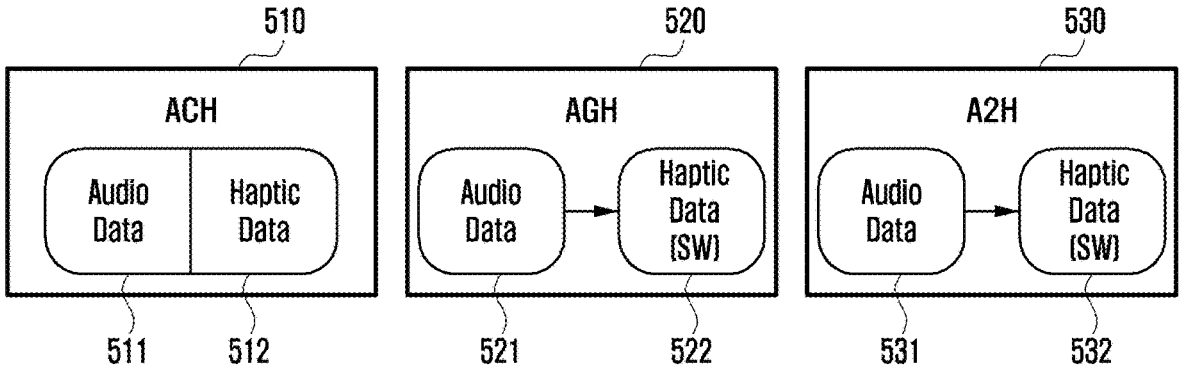
FIG. 5 is an example of a method in which an electronic device outputs a tactile signal simultaneously with audio data according to various embodiments.

FIG. 5 is an example of a method in which an electronic device outputs a tactile signal simultaneously with audio data according to various embodiments.

With reference to FIG. 5, the method that the electronic device (e.g., the electronic device 101 of FIG. 1, the electronic device 101 of FIG. 2, and the electronic device 101 of FIG. 3) outputs a tactile signal simultaneously with audio data may include an audio coupled haptic (ACH) method 510 and an audio generated haptic (AGH) method 520.

According to an embodiment, the tactile signal output according to the ACH method 510 may require data including both the audio data 511 and the pre-generated haptic data 512 (e.g., the integrated audio data). In this case, the processor (e.g., the processor 120 of FIG. 3) of the electronic device 101 may control a sound output module (e.g., the sound output module 155 of FIG. 3) and a haptic module (e.g., the haptic module 179 of FIG. 3) so that the audio reproduction and the tactile signal reproduction can occur simultaneously by transmitting the audio data to the audio driver (e.g., the audio driver 671 of FIG. 6) and transmitting the haptic data to the haptic driver (e.g., the haptic driver 673 of FIG. 6). In this case, the haptic driver may be configured to output the haptic data without tuning and/or processing (e.g., post-processing operation) as the haptic data was generated in advance.

According to an embodiment, the tactile signal output according to the AGH method 520 may require audio data 521 that does not include haptic data. In this case, the processor 120 of the electronic device 101 may generate the haptic data based on the audio data using the haptic generation module (e.g., the haptic generation module 633 of FIG. 6). At this time, the processor 120 may control the sound output module (e.g., the sound output module 155 of FIG. 3) and the haptic module (e.g., the haptic module 179 of FIG. 3) so that the audio reproduction and the tactile signal reproduction can occur simultaneously by transmitting the generated haptic data to the haptic driver (e.g., the haptic driver 673 of FIG. 6). In this case, the haptic driver may be configured to output the haptic data after a tuning and/or processing operation with regard to the haptic data. According to an embodiment, the haptic driver may be configured to output the haptic data by transmitting the haptic data and audio data simultaneously with the haptic solution (the haptic solution 675 of FIG. 6) and performing a post-processing operation of tuning and/or processing the haptic data based on the characteristic information of the audio data and the haptic data.

According to an embodiment, a method in which the electronic device 101 outputs a tactile signal simultaneously with audio data may include an audio to haptic (A2H) method 530.

According to an embodiment, the tactile signal output according to the A2H method 530 may require audio data 521 that does not include haptic data. In this case, the processor 120 of the electronic device 101 may control a sound output module (e.g., the sound output module 155 of FIG. 3) and a haptic module (e.g., the haptic module 179 of FIG. 3) so that the audio reproduction and the tactile signal reproduction can occur simultaneously by transmitting the audio data to the audio driver (e.g., the audio driver 671 of FIG. 6) and the haptic data to the haptic driver (e.g., the haptic driver 673 of FIG. 6) without going through the haptic generation module (e.g., the haptic generation module 633 of FIG. 6). In this case, the haptic driver may be configured to perform the operation of tuning and/or processing based on the audio data and output the tactile signal based on the tuned and/or processed audio data.

Figure 6:
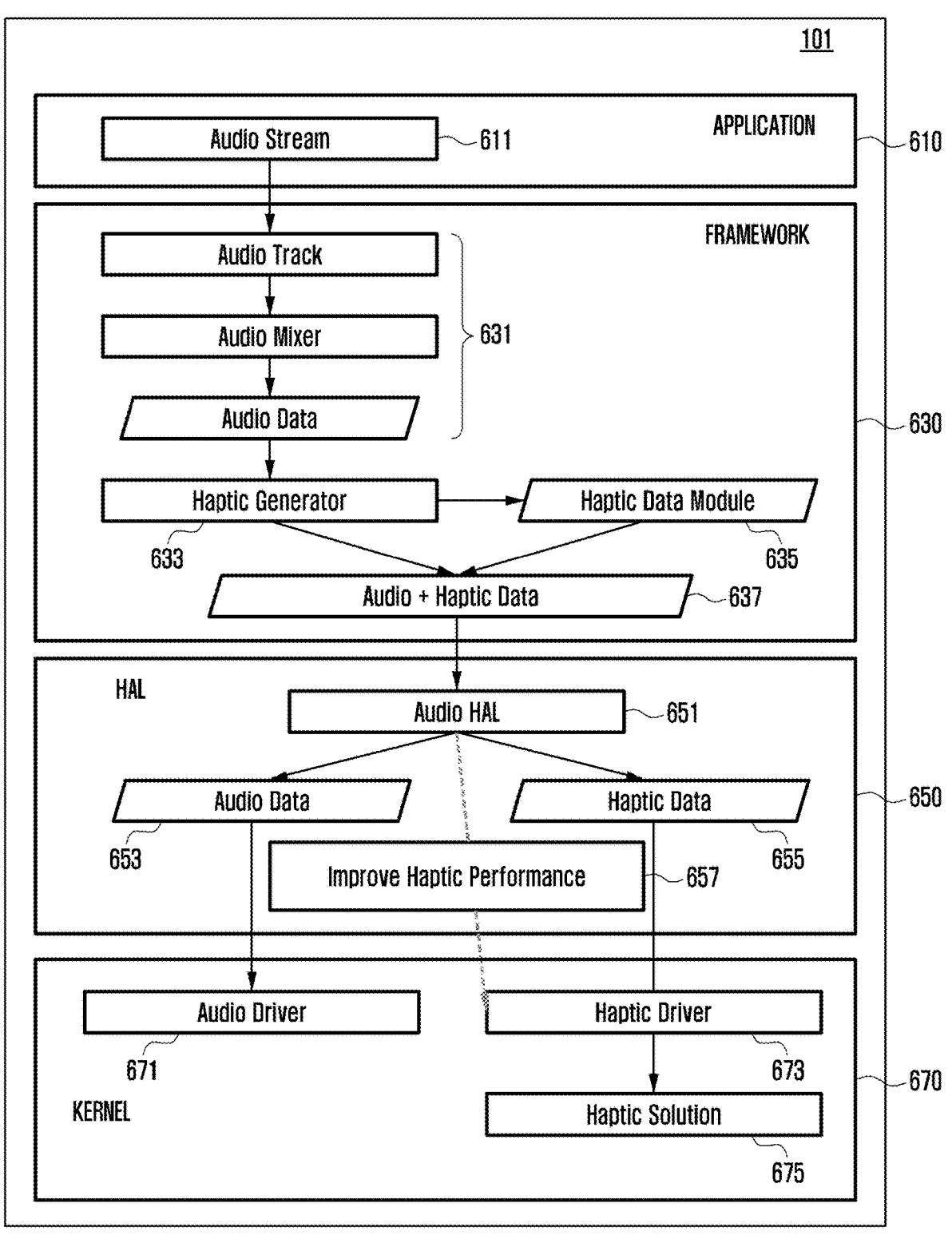
FIG. 6 is a diagram for explaining a processor of an electronic device according to various embodiments.

FIG. 6 is a diagram for explaining a processor of an electronic device according to various embodiments.

With reference to FIG. 6, the processor 120 may generate haptic data based on the audio data and drive a data structure (e.g., the program module (the program 140 of FIG. 1)) required to output a tactile signal. According to an embodiment, a data structure required to generate the haptic data based on the audio data and output the tactile signal may include a plurality of layers. According to an embodiment, a program module may include an operation system (operation system 142 of FIG. 1) that includes a plurality of layers such as an application (application, APP), a layer 610, a framework layer 630, a hardware abstraction layer (HAL) 650, and a kernel layer 670. According to an embodiment, at least a part of the program module may be pre-loaded and stored in a memory (e.g., the memory 130 in FIG. 1) of an electronic device (e.g., the electronic device 101 of FIG. 1) or may be downloaded from an external electronic device (e.g., the server 108 of FIG. 1). According to an embodiment, the memory (e.g., the memory 130 of FIG. 1) of the electronic device 101 may store instructions for controlling the processor 120, a control instruction code, control information, and/or software. For example, the memory 130 may include an audio stream application, an operating system, a middleware, and/or a device driver (e.g., an audio driver, a haptic driver). According to an embodiment, the application, operating system, middleware, and/or device driver stored in the memory 130 may be implemented in a hierarchical structure under the control of the processor 120.

According to an embodiment, the application (application, APP) layer 610 may correspond to at least one application (e.g., the audio stream 611) driven on the operating system according to a user input. For example, the application may correspond to an application including an audio reproduction function. According to an embodiment, the audio stream 611 may generate a signal related to audio reproduction.

According to an embodiment, the framework layer 630 may correspond to a framework that provides an application programming interface (API) for driving an application. The framework, for example, may include a plurality of managers as a set of API programming functions and may be provided in a different configuration according to an operating system. The framework may provide a data transfer path and a function provision path between the application layer 610 and the hardware abstraction layer 650 so that an application can use a limited system resource inside the electronic device 101 or control a designated hardware module. According to an embodiment, the framework layer 630 may specify the audio output track including the audio module 631 (e.g., audio track, audio mixer, audio data), transmit the reproduction signal, and read the audio data for reproduction. According to an embodiment, the framework layer 630 may generate the haptic data based on the audio data including a haptic generator 633, transmit the generated haptic data to the haptic data module 635, integrate the audio data and the haptic data into the audio-haptic data integration module (the audio+haptic data 637), and deliver to the hardware abstraction layer 650.

According to an embodiment, the hardware abstraction layer (HAL) 650 may provide a standard interface for using various hardware functions for the framework, or a library module of designated hardware. According to an embodiment, the hardware abstraction layer 650 may include an audio HAL 651 and an audio data 653. According to an embodiment, audio HAL (651) may implement an interface to a hardware component of the same type as the sound output module (e.g., the sound output module 155 of FIG. 3) and provide the implemented interface to the framework 650. According to various embodiments, the hardware abstraction layer 650 may include the audio data 653 and the haptic data 655, and the audio HAL 651 may separate the integrated audio data including the haptic data, divide it into audio data and haptic data, and provide interfaces that transmit the audio data and the haptic data to the audio driver 671 and the haptic driver 673, respectively, of the kernel layer 670. According to an embodiment, the hardware abstraction layer 650 may include a haptic performance improvement module 657, provide a direct interface that enables post-processing of the haptic data based on the audio data in the haptic solution 675 of the kernel layer 670, and provide the audio data to the haptic driver 673 for post-processing of the haptic data without adding the hardware interface.

According to an embodiment, the kernel layer 670 may include a device driver, which is a set of commands required to control various pieces of hardware and/or a system resource manager that controls, allocates, or recovers system resources. According to an embodiment, the device driver may include an audio driver 671, which is a set of commands required to control the sound output module (e.g., the sound output module 155 of FIG. 3), and a haptic driver 673, which is a set of commands required to control the haptic module (e.g., the haptic module 179 of FIG. 3). According to an embodiment, the haptic driver 673 may exchange the data in connection with the haptic module 179. For example, the haptic driver 673 may transmit to the haptic module 179 the data instructing (or designating) waveform information of the haptic data to be transmitted to the processor 120. According to an embodiment, the haptic driver 673 may transmit the audio data and the haptic data to the haptic solution 675 in the case of receiving audio data from the haptic improvement module 657. The haptic solution 675 may post-process and transmit haptic data so that it can optimize the haptic operation with the haptic module 179. According to an embodiment, the audio driver 671 may transmit to the sound output module 155 the information (e.g., the data indicating (or designating) volume information) about the output of audio data to be output in the sound output module 155.

Figure 7:
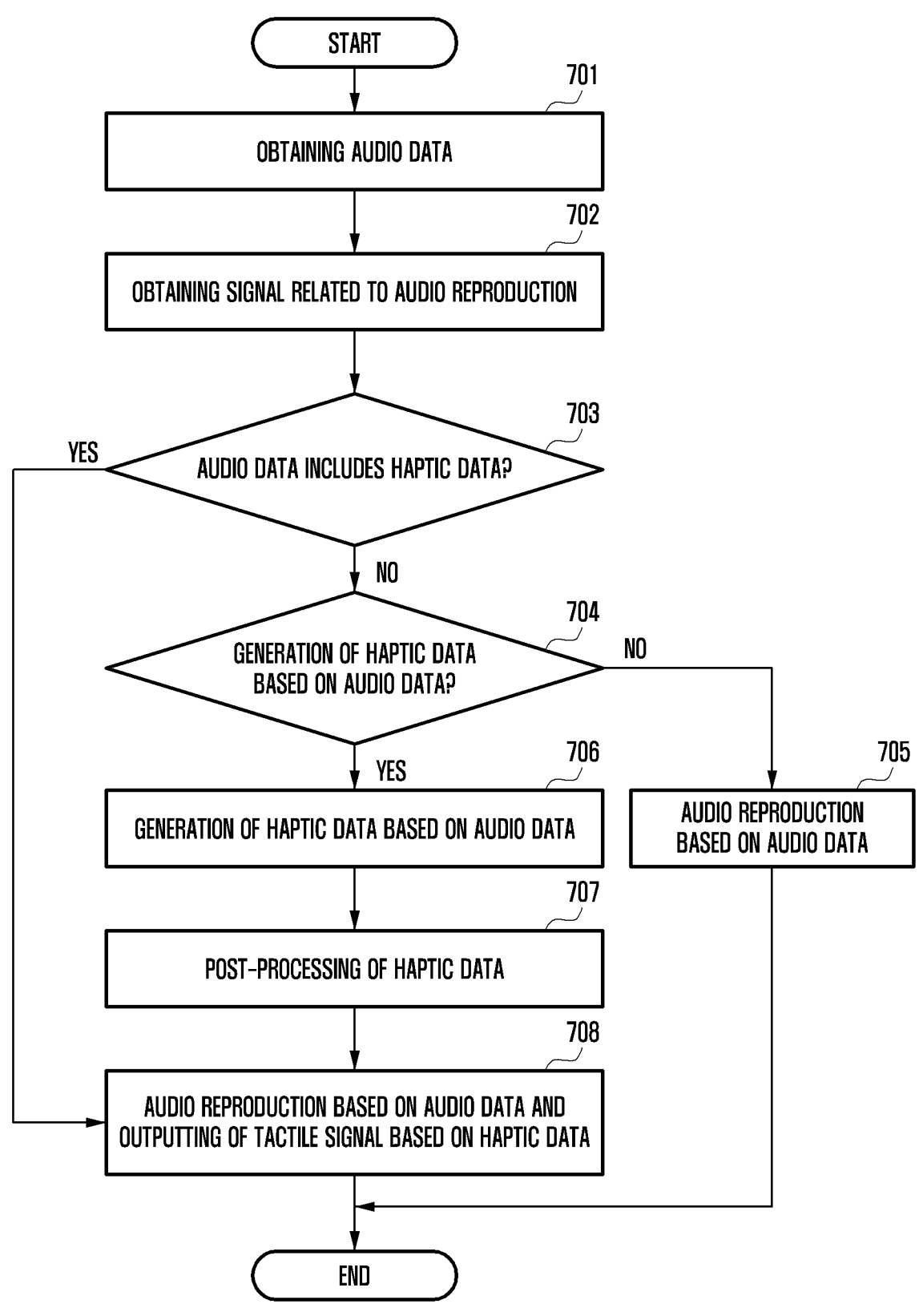
FIG. 7 is a flowchart illustrating an operation in which an electronic device outputs a tactile signal according to various embodiments.

FIG. 7 is a flowchart illustrating an operation in which an electronic device outputs a tactile signal according to various embodiments.

With reference to FIG. 7, each operation of the electronic device (e.g., the electronic device 101 of FIG. 1, the electronic device 101 of FIG. 2, and the electronic device 101 of FIG. 3) that outputs a tactile signal may be understood as an operation performed by the processor (the processor 120 of FIG. 3) of the electronic device 101. The order of each operation in FIG. 7 may be changed with each other and there may be a change or substitution of each operation and/or addition of some operations.

With reference to operation 701, the processor 120 may obtain the audio data. According to various embodiments, the processor 120 may obtain audio data (e.g., the audio data 211 of FIG. 2). According to an embodiment, the electronic device 101 may generate the audio data, read the data previously stored in the memory (e.g., the memory 130 of FIG. 1), or obtain the audio data by receiving the data from another external electronic device through a network (e.g., the first network 198 or the second network 199 of FIG. 1). According to an embodiment, the audio data obtained by the processor 120 may include the integrated audio data containing the haptic data. The integrated audio data may include the data in a format in which at least a portion of the audio data and at least a portion of the haptic data are connected and intersected in time order.

With reference to operation 702, the processor 120 may obtain a signal related to audio reproduction. Signals related to audio reproduction may include a signal for controlling the electronic device 101 to reproduce audio data and output an audio signal to the outside. For example, the signal related to the audio reproduction may include a signal for starting the reproduction of the audio signal. According to an embodiment, the processor 120 may generate a signal related to the audio reproduction based on an input received from the external source (e.g., the user).

With reference to operation 703, the processor 120 may identify whether the audio data includes haptic data. According to an embodiment, the processor 120 may check the audio data and identify whether the obtained audio data is integrated audio data, in other words, whether the audio data includes haptic data. According to an embodiment, the processor 120 may identify whether to generate the audio data-based haptic data based on the obtained audio data. For example, in the case that the obtained audio data is the integrated audio data, the processor 120 may identify that the haptic data based on the audio data is not generated because the audio data already includes the haptic data. In the case that the audio data is the integrated audio data, the processor 120 may proceed to operation 708 and in the case that the audio data is not the integrated audio data, the processor 120 may proceed to operation 704.

With reference to operation 704, the processor 120 may identify whether to generate haptic data based on audio data. According to an embodiment, the processor 120 may identify whether to generate haptic data based on audio data based on a user input received from the outside. According to an embodiment, the processor 120 may identify whether to generate haptic data based on a running application. The processor 120 may proceed to operation 706 in the case of generating the haptic data based on the audio data as a result of the identification. Or, the processor 120 may proceed to operation 705 in the case of not generating the haptic data based on the audio data as a result of the identification.

With reference to operation 705, the processor 120 may reproduce an audio based on audio data. The processor 120 may reproduce the audio data obtained in response to a signal related to the audio reproduction without generating the haptic data based on the audio data. According to an embodiment, the processor 120 may convert the audio data obtained by controlling the sound output module (e.g., the sound output module 155 of FIG. 3) into an audio signal that is an analog signal, and output the converted audio signal to the outside.

With reference to operation 706, the processor 120 may generate the haptic data based on the audio data. According to various embodiments, the processor 120 may generate the audio data-based haptic data. According to various embodiments, the processor 120 may generate the haptic data based on the audio data. According to an embodiment, the audio data and/or the haptic data may include an electrical signal including a digital signal. According to an embodiment, the audio data and/or the haptic data may include data expressed by a pulse code modulation (PCM) method. According to an embodiment, the processor 120 may generate the haptic data based on the audio data. The processor 120 may generate the haptic data by analyzing one or more parameters (e.g., frequency, duration, amplitude, or waveform) included in the audio data. The processor 120, in order to generate the haptic data based on the audio data, may modulate by changing the characteristics such as the amplitude and/or the frequency of the audio data or may use various techniques such as sampling and/or filtering. According to an embodiment, the processor 120 may store a library containing data pertaining to one or more vibration waveforms in a memory (e.g., the memory 130 of FIG. 1) and may generate the haptic data by combining haptic signals of corresponding waveforms based on audio data. The audio data and/or the haptic data generated based on the audio data may include one or more markers for synchronization with each other. The processor 120 may generate the haptic data by generating and inserting one or more markers in the case of generating the haptic data. According to an embodiment, the audio data may be the data including the haptic data in advance. For example, audio data for outputting an audio signal and haptic data for outputting a tactile sense may be integrated in one piece of data (e.g., the integrated audio data). The integrated audio data containing the haptic data may include the data in a format in which at least a portion of the audio data and at least a portion of the haptic data are connected and intersected in time order. For example, the integrated audio data may be in a format in which the audio data is divided into frame units, the corresponding haptic data is also divided into the same frame unit, and both are integrated to intersect each other. According to an embodiment, the processor 120 may generate the integrated audio data by integrating the audio data and the haptic data. The processor 120 may generate integrated audio data by connecting at least a portion of the audio data and at least a portion of the haptic data 221 through corresponding and intersecting in time order. For example, the processor 120 may generate the integrated audio data by dividing the audio data into frame units and also dividing the corresponding haptic data into the same frame units, and integrating so that audio data and haptic data can intersect each other in time order.

With reference to operation 707, the processor 120 may post-process the generated haptic data. According to an embodiment, the processor 120 may extract characteristic information of the audio data. The characteristic information of the audio data may include at least one of waveform of audio data, amplitude, frequency, and duration or a combination thereof. According to an embodiment, the characteristic information of the audio data may include the data resulting from processing the audio data. For example, there may be the audio data filtered using a specified filter or the audio data from which noise has been removed. According to an embodiment, the processor 120 may extract characteristic information of the audio data based on data obtained by modulating the audio data based on a specified algorithm. According to an embodiment, the processor 120 may control the haptic module (e.g., the haptic module 179) and post-process the haptic data based on characteristic information of the audio data. According to an embodiment, the processor 120 may post-process the haptic data based on the characteristic information of the extracted audio data. According to an embodiment, the processor 120 may extract characteristic information of the generated haptic data. The characteristic information of the haptic data may include at least one of waveform of haptic data, amplitude, frequency, and duration or a combination thereof. The processor 120 may post-process the haptic data based on the characteristic information of the haptic data. According to an embodiment, the processor 120 may post-process the haptic data by filtering or modulating and correcting the haptic data.

With reference to operation 708, the processor 120 may reproduce the audio based on the audio data and output the tactile signal based on the haptic data. According to various embodiments, the processor 120 may reproduce the audio. The processor may reproduce the audio data and output the audio signal 210. According to an embodiment, the processor 120 may control the sound output module 155, convert the obtained audio data into an audio signal that is an analog signal, and output it to the outside. According to various embodiments, the processor 120 may output a tactile signal based on the haptic data. The tactile signal may include a signal that allows the user to feel tactile, for example, vibration, force, impact, texture, temperature, or a combination thereof. The processor 120 may output a tactile signal that includes one or more vibration conditions (e.g., vibration frequency, vibration duration, vibration intensity, vibration waveform, or vibration position) based on the haptic data. According to an embodiment, the processor 120 may control the haptic module 179, convert the haptic data into an analog tactile signal, and output to the outside. According to various embodiments, the processor 120 may output an audio signal and a tactile signal simultaneously. According to an embodiment, the processor 120 may output the audio signal and the tactile signal based on the audio data and the haptic data that the electronic device 101 generates based on the audio data. According to an embodiment, the processor 120 may output simultaneously the audio signal and the tactile signal that correspond to each other by synchronizing the audio data and the haptic data. According to an embodiment, the processor 120 may synchronize and reproduce the audio data and the haptic data based on one or more markers included in the audio data and/or haptic data.

Figure 8:
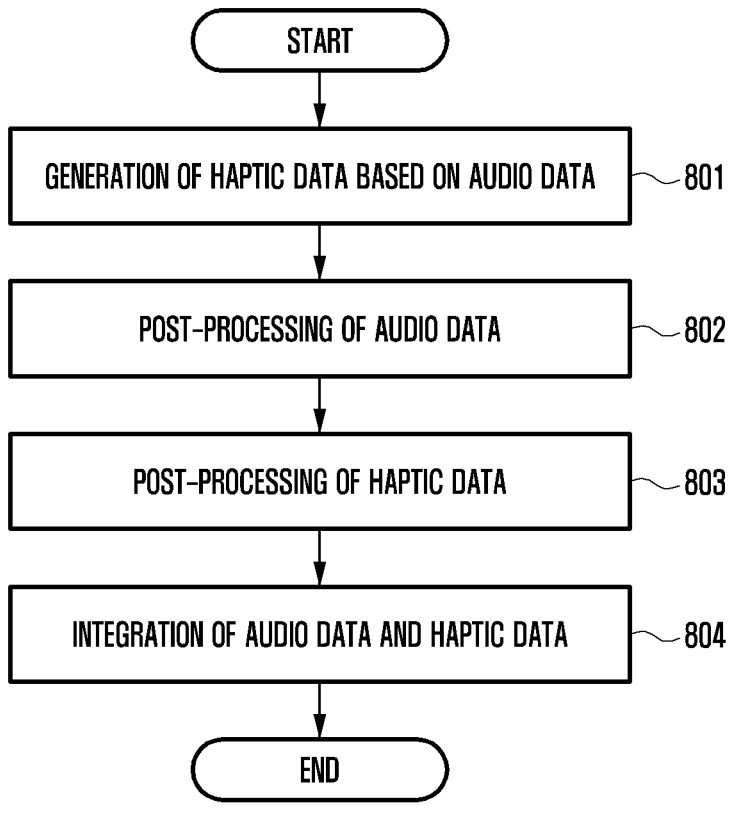
FIG. 8 is a flowchart illustrating an operation in which an electronic device generates haptic data using media data according to various embodiments.

FIG. 8 is a flowchart illustrating an operation in which an electronic device generates haptic data using media data according to various embodiments.

With reference to FIG. 8, each operation that the electronic device (e.g., the electronic device 101 of FIG. 1, the electronic device 101 of FIG. 2, and the electronic device 101 of FIG. 3) outputting a tactile signal generates the haptic data using the media data may be understood as an operation performed by the processor (the processor 120 of FIG. 3) of the electronic device 101. The order of each operation in FIG. 8 may be changed by each other and there may be a change or substitution of each operation and/or addition of some operations.

With reference to operation 801, the processor 120 may generate the haptic data based on the audio data. According to various embodiments, the processor 120 may generate the audio data-based haptic data. According to various embodiments, the processor 120 may generate the haptic data based on the audio data. According to an embodiment, the audio data and/or the haptic data may include an electrical signal including a digital signal. According to an embodiment, the audio data and/or the haptic data may include data expressed by a pulse code modulation (PCM) method. According to an embodiment, the processor 120 may generate the haptic data based on the audio data. The processor 120 may generate the haptic data by analyzing one or more parameters (e.g., frequency, duration, amplitude, or waveform) included in the audio data. The processor 120, in order to generate the haptic data based on the audio data, may modulate by changing feature such as the amplitude and/or the frequency of the audio data or may use various techniques such as sampling and/or filtering. According to an embodiment, the processor 120 may store a library containing data pertaining to one or more vibration waveforms in a memory (e.g., the memory 130 of FIG. 1) and may generate the haptic data by combining haptic signals of corresponding waveforms based on audio data. The audio data and/or the haptic data generated based on the audio data may include one or more markers for synchronization with each other. The processor 120 may generate the haptic data by generating and inserting one or more markers in the case of generating the haptic data.

With reference to operation 802, the processor 120 may post-process the obtained audio data. The processor 120 may adjust the volume of audio data and post-process the audio data by inserting the effects into the audio data. The processor 120 may post-process the audio data by separating only the audio data excluding the generated haptic data.

With reference to operation 803, the processor 120 may post-process the generated haptic data. According to an embodiment, the processor 120 may extract characteristic information of the audio data. The characteristic information of the audio data may include at least one of waveform of audio data, amplitude, frequency, and duration or a combination thereof. According to an embodiment, the characteristic information of the audio data may include the data resulting from processing the audio data. For example, there may be the audio data filtered using a specified filter or the audio data from which noise has been removed. According to an embodiment, the processor 120 may extract characteristic information of the audio data based on data obtained by modulating the audio data based on a specified algorithm. According to an embodiment, the processor 120 may control the haptic module (e.g., the haptic module 179) and post-process the haptic data based on characteristic information of the audio data. According to an embodiment, the processor 120 may post-process the haptic data based on the characteristic information of the extracted audio data. According to an embodiment, the processor 120 may extract characteristic information of the generated haptic data. The characteristic information of the haptic data may include at least one of waveform of haptic data, amplitude, frequency, and duration or a combination thereof. The processor 120 may post-process the haptic data based on the characteristic information of the haptic data. According to an embodiment, the processor 120 may post-process the haptic data by filtering or modulating and correcting the haptic data.

With reference to operation 804, the processor 120 may integrate audio data and haptic data. The processor 120 may generate the integrated audio data by integrating the audio data and the haptic data. The integrated audio data containing the haptic data may include the data in a format in which at least a portion of the audio data and at least a portion of the haptic data are connected and intersected in time order. For example, the integrated audio data may be in a format in which the audio data is divided into frame units, the corresponding haptic data is also divided into the same frame units, and both are integrated to cross each other. According to an embodiment, the processor 120 may generate the integrated audio data by integrating the audio data and the haptic data. The processor 120 may generate the integrated audio data by connecting at least a portion of the audio data and at least a portion of the haptic data through corresponding and interacting in time order. For example, the processor 120 may generate the integrated audio data by dividing the audio data into frame units and also dividing the corresponding haptic data into the same frame units, and integrating so that audio data and haptic data can cross each other in time order.

Figure 9:
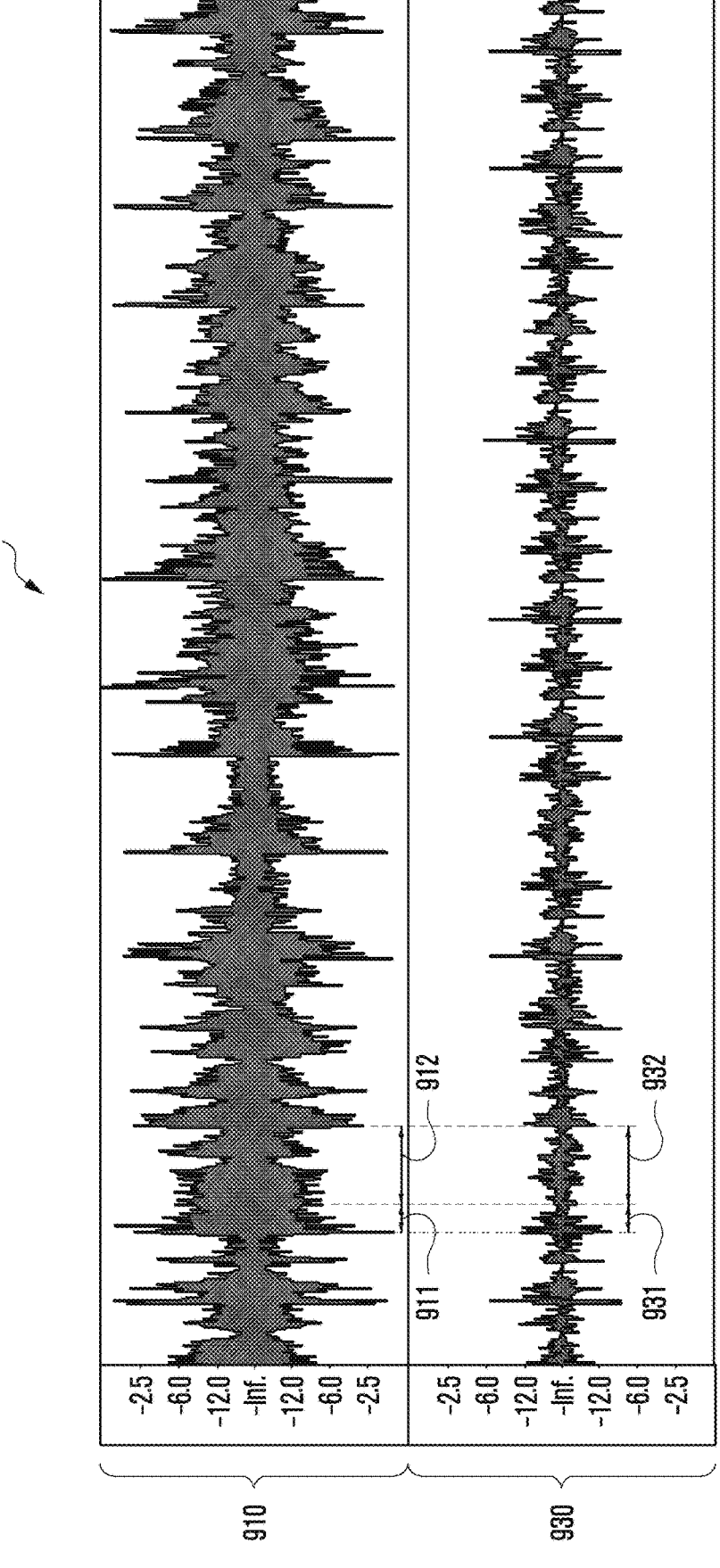
FIG. 9 illustrates media data and haptic data generated by an electronic device using the media data according to a comparative example.

FIG. 9 illustrates media data and haptic data generated by an electronic device using the media data according to a comparative example.

Figure 10:
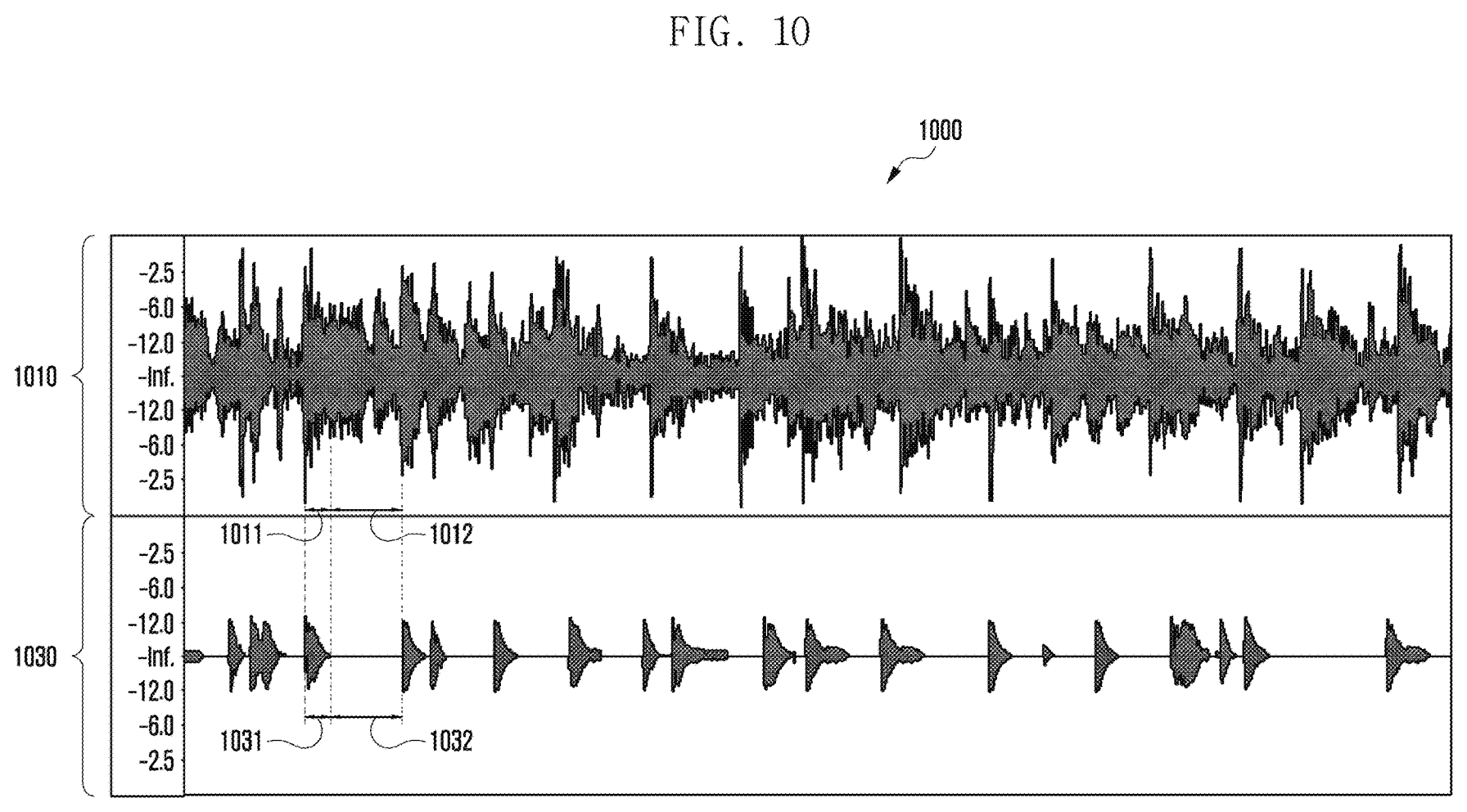

FIG. 10 illustrates the haptic data generated by an electronic device (e.g., the electronic device 101 of FIG. 1, the electronic device 101 of FIG. 2, and/or the electronic device 101 of FIG. 3) using the media data according to various embodiments.

With reference to FIG. 9, the media data (e.g. the audio data 910) and the haptic data 930 generated based on the audio data 910 may be compared. The haptic data 930 according to the comparative embodiment may be a case in which post-processing of the haptic data has not been performed. With reference to the graph 900 of FIG. 9, the data of the first time period 911 of the audio data 910 and the data of the first time period 931 of the haptic data 930 may correspond and the data of the second time period 912 of the audio data 910 and the data of the second time period 932 of the haptic data 930 may correspond to each other.

With reference to FIG. 10, the media data (e.g. the audio data 1010) and the haptic data 1030 generated based on the audio data 1010 may be compared. The haptic data 1030 according to various embodiments disclosed in this document may be the data for post-processing and outputting haptic data generated based on the audio data 1010. With reference to graph 1000 of FIG. 10, the data of the first time period 1011 of the audio data 1010 and the data of the first time period 1031 of the haptic data 1030 may correspond, and the data of the second time period 1012 of the audio data 1010 and the data of the second time period 1032 of the haptic data 1030 may correspond to each other. In the case of the audio data 1010, the same data as the audio data 910 of FIG. 9 is explained as an example.

In the case of comparing FIG. 9 and FIG. 10 with each other, the data 911 and 931 on the first time period of FIG. 9 may be compared with the data 912 and 932 on the second time period, and it may be difficult to express the strength and weakness of the tactile output compared with the difference between the strength and weakness of the sound. Tactile sense is less sensitive than hearing because of the nature of the human body; therefore, in order to increase usability it may be more effective in the case that the strength and weakness of the tactile output is expressed in an extreme way compared with the audio data. With reference to FIG. 10, a mute section (e.g., the second time section 1032 of haptic data) can be set through post-processing of audio data, and it is possible to provide a more excellent effect for tactile sensation of the difference in sound intensity. In addition, in the case of comparing the first time period 931 of the haptic data in FIG. 9 with the first time period 1031 of the haptic data in FIG. 10, it can be identified that the pattern of the haptic data is changed to a high-density dynamic pattern. The haptic data of FIG. 9 substantially matches with the waveform of simple audio data without post-processing, and the haptic data of FIG. 10 generated according to various embodiments may be more appropriate in consideration of the characteristics of the human body's sensitivity to sense a tactile signal.

Figure 11:
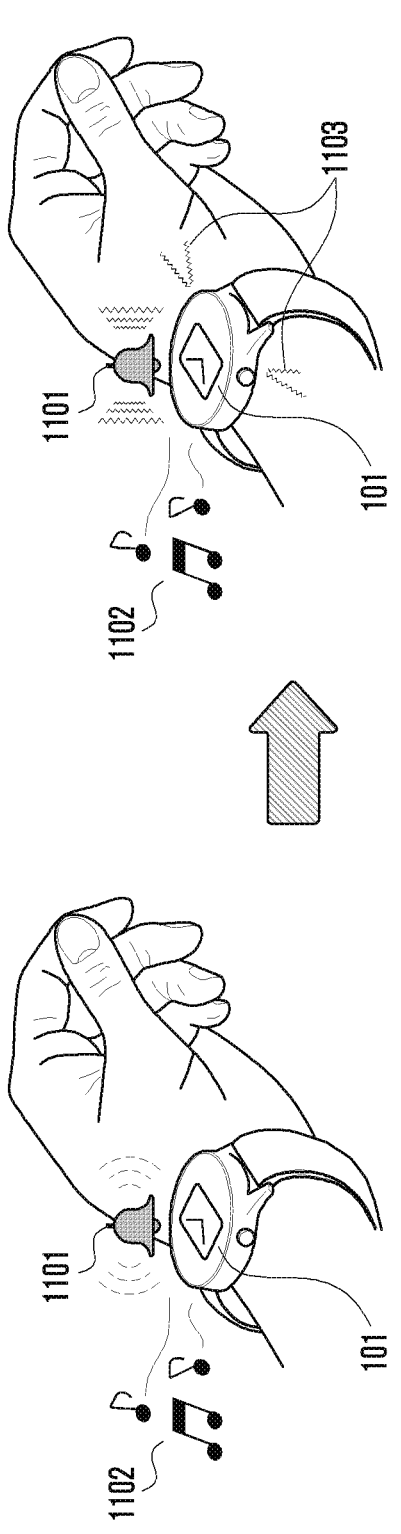
FIG. 11 illustrates outputting a tactile signal simultaneously with audio reproduction in the case that an electronic device reproduces various types of audio data according to many embodiments.

FIG. 11 illustrates that the electronic device 101 outputs the tactile signal simultaneously with the audio reproduction in the case of reproducing a plurality of pieces of audio data according to various embodiments.

Figure 12:
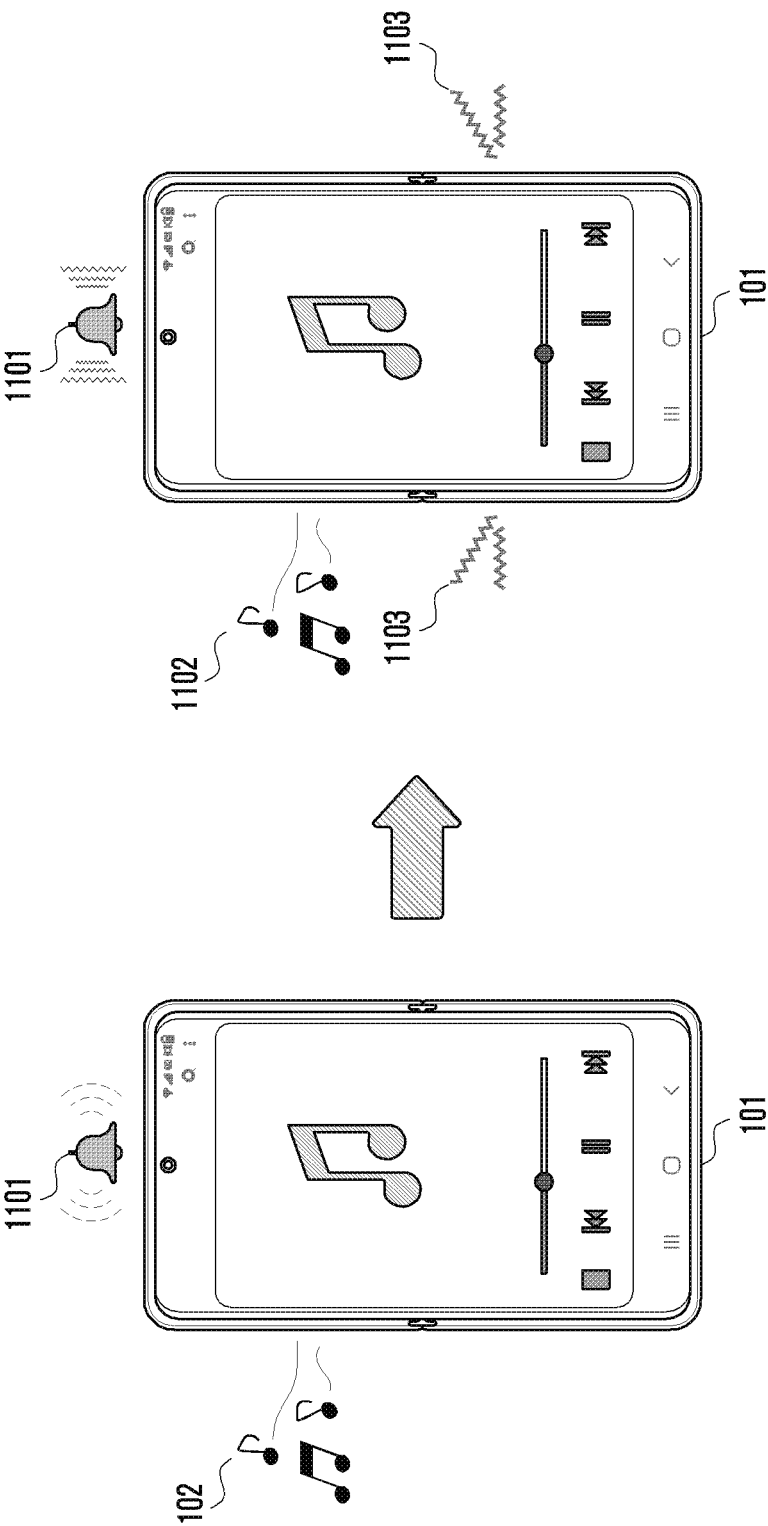
FIG. 12 illustrates outputting a tactile signal simultaneously with audio reproduction in the case that an electronic device reproduces a plurality of pieces of audio data according to various embodiments.

FIG. 12 illustrates that the electronic device 101 outputs the tactile signal simultaneously with the audio reproduction in the case of reproducing a plurality of pieces of audio data according to various embodiments.

With reference to FIG. 11, the electronic device 101 (e.g., the electronic device 101 of FIG. 1, the electronic device 11 of FIG. 2, the electronic device 101 of FIG. 3) may include a smart watch and, with reference to FIG. 12, the electronic device 101 (the electronic device 101 of FIG. 1, the electronic device 11 of FIG. 2, the electronic device 101 of FIG.

3) may include a smartphone, but this is an exemplary view and the type of the electronic device 101 is not be limited.

With reference to FIG. 11 and FIG. 12, the electronic device 101 may obtain a plurality of pieces of audio data. According to an embodiment, the electronic device 101 may receive a plurality of pieces of different audio data from an external electronic device, or obtain a plurality of pieces of audio data by pre-storing. The electronic device 101 may simultaneously reproduce a plurality of pieces of obtained audio data. For example, the processor (e.g., the processor 120 of FIG. 3) of the electronic device 101 may sum up a plurality of pieces of audio data and simultaneously output the summed audio data.

According to various embodiments, the electronic device 101 may generate haptic data based on at least a portion of the plurality of pieces of obtained audio data. According to an embodiment, the electronic device 101 may identify at least some data for generating haptic data based on audio data among a plurality of pieces of audio data. According to an embodiment, the electronic device 101 may selectively generate haptic data based on only some audio data among the plurality of pieces of audio data. According to an embodiment, the electronic device 101 may generate haptic data based on data of a partial section among some audio data. According to an embodiment, the electronic device 101 may receive an input for selecting data to generate haptic data from a plurality of pieces of the audio data and select the audio data for generating the haptic data from a plurality of pieces of audio data based on the received input. According to an embodiment, the electronic device 101 may store in advance the information about audio data to generate haptic data and select the audio data for generating haptic data based on the stored information. According to an embodiment, the electronic device 101 may generate haptic data based on some audio data selected from a plurality of pieces of audio data. With reference to FIG. 11 and FIG. 12, the electronic device 101 may obtain voice notification data (e.g., the first audio data 1101) and sound source data (e.g., the second audio data 1102) and reproduce them at the same time. With reference to FIG. 11 and FIG. 12, the electronic device 101 may generate haptic data based on only the first audio data 1101 among the first audio data 1101 and the second audio data 1102. The electronic device 101 may not generate haptic data based on the second audio data 1102 by inactivating the generation of haptic data with respect to the second audio data 1102. According to an embodiment, the electronic device 101 may output a tactile signal based on the generated haptic data. The electronic device 101 may output the tactile signal 1103 simultaneously with the first audio data 1101 and the second audio data 1102.

Figure 13:
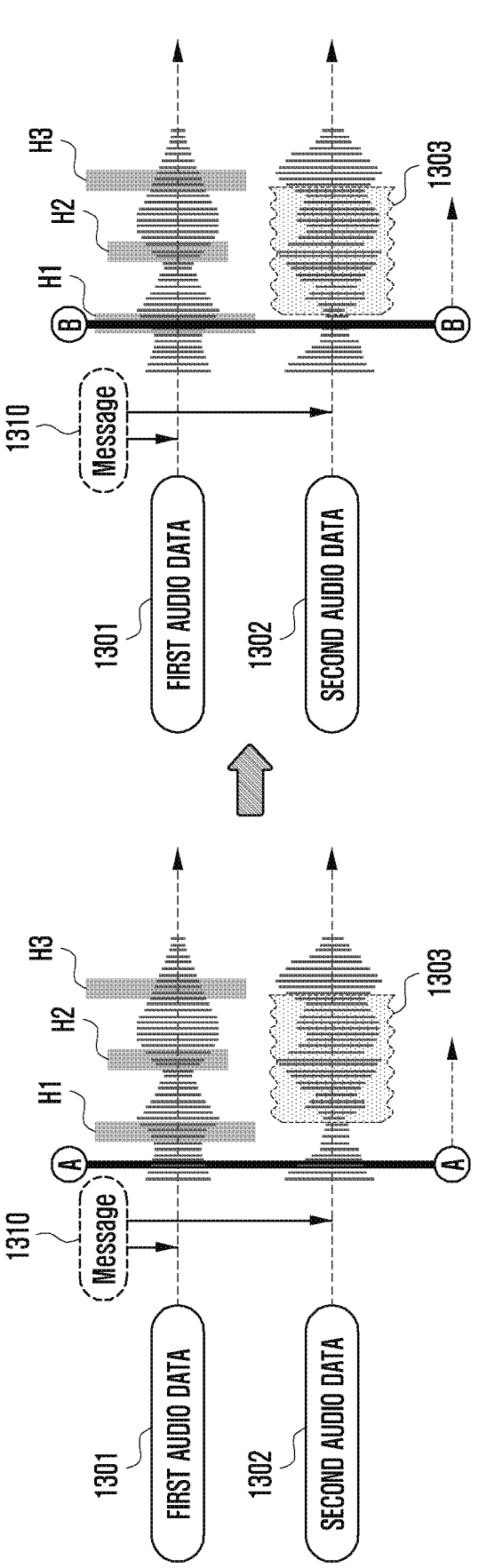
FIG. 13 illustrates a plurality of pieces of audio data and haptic data in the case that an electronic device reproduces a plurality of pieces of audio data according to various embodiments.

FIG. 13 illustrates a plurality of pieces of audio data and haptic data in the case that an electronic device reproduces a plurality of pieces of audio data according to various embodiments.

According to an embodiment, the electronic device (e.g., the electronic device 101 of FIG. 1, the electronic device 101 of FIG. 2, and the electronic device 101 of FIG. 3) may obtain a plurality of pieces of audio data (e.g., the first audio data 1301 and the second audio data 1302). According to an embodiment, the electronic device 101 may generate the haptic data (the reference numerals H1, H2, and H3) based on at least portion of the plurality of pieces of audio data (e.g., the first audio data 1301). According to an embodiment, the electronic device 101 may generate a plurality of pieces of the haptic data (e.g., the reference numerals H1, H2, and H3) based on at least the partial section of the audio data (e.g., the first audio data 1301). According to an embodiment, the electronic device 101 may generate the haptic data (e.g., the reference numerals H1, H1, and H3) based on some audio data (e.g., the first audio data 1301) out of a plurality of pieces of audio data (e.g., the first audio data 1301 and the second audio data 1302). With reference to FIG. 13, message reception may be performed while the electronic device 101 reproduces a sound source (e.g., the second audio data 1302). The electronic device 101 may obtain the first audio data 1301 corresponding to the voice notification signal for the message in response to the mes- sage reception 1310. The electronic device 101 may identify the audio data to generate the haptic data (e.g., the reference numerals H1, H2, and H3) between the first audio data 131 and the second audio data 1302. The audio data to generate haptic data may be selected based on pre-stored settings. The electronic device 101 may select the first audio data 1301 and generate the haptic data (e.g., the reference numerals H1, H2, and H3) based on at least a partial section of the first audio data 1301. According to an embodiment, the elec- tronic device 101 may combine and synthesize each piece of haptic data with at least a portion of the first audio data 1301. For example, a plurality of pieces of data obtained by dividing the first audio data 1301 into frame units and a plurality of pieces of haptic data (e.g., the reference numer- als H1, H2, and H3) may be synthesized by crossing the divided data to correspond to the same time point as each piece of divided data of the first audio data 1301 based on the reproduction section. The electronic device 101 may simultaneously reproduce or output all of the first audio data 1301, the second audio data 1302, and the haptic data. With reference to FIG. 13, the electronic device 101 may simul- taneously reproduce the first audio data 1301 and the second audio data 1302 at a time point A, and output the haptic data H1 generated at the time point B simultaneously with the reproduction of the corresponding section of the first audio data 1301 to the haptic data H1 and the corresponding section of the second audio data 1302 to the haptic data H1. The electronic device 101 may not generate the haptic data with respect to the second audio data 1302 despite section 1303 corresponding to the generation of the haptic data.

An electronic device according to various embodiments disclosed in this document may include a haptic module including at least a motor and outputting a tactile signal; a sound output module including at least one of a speaker and a receiver; and a processor operatively connected to the haptic module and the sound output module, wherein the processor is configured to obtain audio data and a signal related to audio data reproduction; identify whether to generate haptic data based on the audio data; in response to the identification, generate haptic data based on the audio data; reproduce the audio data based on a signal related to the audio data reproduction through the sound output mod- ule; control the haptic module; and output the tactile signal based on the generated haptic data.

In addition, the processor may be configured to identify whether to generate the audio data-based haptic data based on a user input, a function of an application being executed simultaneously with the reproduction of the audio data, and at least a portion of the audio data.

In addition, the haptic data may be pulse code modulation (PCM) based data.

In addition, the processor, based on at least a portion of the audio data, may identify whether the obtained audio data includes haptic data, and in the case that the audio data includes the haptic data, the processor may be configured to output the tactile signal based on the haptic data included in the audio data.

In addition, the processor may be configured to generate one piece of audio data by integrating the audio data and the generated haptic data.

In addition, the processor may be configured to post- process the generated haptic data, control the haptic module, and output the tactile signal based on the post-processed haptic data.

In addition, the processor may be configured to analyze at least one of the generated haptic data and the obtained audio data, extract the characteristic information, and post-process the haptic data based on the extracted characteristic infor- mation.

In addition, the characteristic information may include at least one of waveform, amplitude, frequency, and duration of the haptic data or audio data, or a combination thereof.

In addition, the processor may be configured to extract characteristic information of the audio data and generate the haptic data based on the extracted characteristic information.

In addition, the characteristic information may include at least one of waveform, amplitude, frequency, and duration of the audio data.

In addition, the processor may be configured to, in the case of obtaining a plurality of pieces of audio data and reproducing the plurality of pieces of the audio data simul- taneously, identify at least a portion of data to generate the audio data-based haptic data among a plurality of pieces of audio data, and generate the haptic data based on at least a portion of the identified data.

A method for providing an output of a tactile signal by an electronic device, according to various embodiments dis- closed in this document, may include an operation of obtain- ing audio data and a signal related to audio data reproduc- tion; an operation of identifying whether to generate haptic data based on the audio data; in response to the identifica- tion, an operation of generating haptic data based on the audio data; and an operation of outputting the tactile signal based on the generated haptic data.

In addition, the operation to identify whether to generate the above may include an operation of identifying whether to generate the audio data-based haptic data based on a user input, a function of an application being executed simulta- neously with the reproduction of the audio data, and at least a portion of the audio data.

In addition, the haptic data may be pulse code modulation (PCM) based data.

In addition, the operation to identify whether to generate the above may include an operation of identifying whether the obtained audio data includes the haptic data based on at least a portion of the audio data, and further may include outputting the tactile signal based on the haptic data included in the audio data in the case that the audio data includes the haptic data.

In addition, the operation of generating the haptic data may include an operation of generating one piece of audio data by integrating the audio data and the generated haptic data.

In addition, further comprising the operation of post- processing the generated haptic data, outputting the tactile signal may include outputting the tactile signal based on the post-processed haptic data.

In addition, the post-processing operation may include an operation of extracting characteristic information by analyz- ing at least one of the generated haptic data and the obtained audio data, and an operation of post-processing the haptic data based on the extracted characteristic information.

In addition, the characteristic information may include at least one of waveform, amplitude, frequency, and duration of the haptic data or audio data, or a combination thereof.

In addition, the operation of generating the haptic data may include an operation of extracting characteristic information of the audio data and an operation of generating the haptic data based on the extracted characteristic information.

In addition, the characteristic information may include at least one of waveform, amplitude, frequency, and duration of the audio data.

In addition, in the case that the obtained audio data includes a plurality of pieces of audio data, an operation of simultaneously reproducing the plurality of pieces of audio data, an operation of identifying at least a portion of data to generate the audio data-based haptic data among the plurality of pieces of audio data, and an operation of generating the haptic data based on the identified at least a portion of the data may be included.

The electronic device according to various embodiments disclosed in this document may be various types of devices. The electronic device may include a portable communication device (e.g., a smartphone), a computer device, a portable multimedia device, a portable medical device, a camera, a wearable device, or home appliances, for example. The electronic device according to various embodiments of this document is not limited to the aforementioned devices.

Various embodiments of this document and terms used in the embodiments are not intended to limit the technical characteristics, described in this document, to specific embodiments, and should be understood as including various changes, equivalents, or alternatives of a corresponding embodiment. In relation to the description of the drawings, similar reference numerals may be used for similar or related elements. A singular form of a noun corresponding to an item may include one item or a plurality of items unless explicitly described otherwise in the context. In this document, each of phrases, such as "A or B," "at least one of A and B," "at least one of A or B," "A, B or C," "at least one of A, B and C," and "at least one of A, B, or C," may include any one of items listed along with a corresponding one of the phrases or all possible combinations of the listed items. Terms such as a "first," a "second," or "the first" or "the second" may be used to merely distinguish between a corresponding element and another corresponding element, and they do not limit the corresponding elements in another aspect (e.g., importance or a sequence). If any (e.g., first) element is described as being "coupled" or "connected" to another (e.g., a second) element along with a term "functionally" or "communicatively" or without such a term, this means that the any element may be coupled to the other element directly (e.g., in a wired way), wirelessly, or through a third element.

The term "module" used in various embodiments of this document may include a unit implemented as hardware, software, or firmware and may be interchangeably used with a term such as logic, a logical block, a part, or a circuit. The module may be an integrated part, or a minimum unit of the part or a part thereof, which performs one or more functions. For example, according to an embodiment, the module may be implemented in the form of an application-specific integrated circuit (ASIC).

Various embodiments of this document may be implemented as software (e.g., the program 140) including one or more instructions stored in a storage medium (e.g., the embedded memory 136 or the external memory 138) readable by a machine (e.g., the electronic device 101). For example, a processor (e.g., the processor 120) of a machine (e.g., the electronic device 101) may invoke at least one of the one or more instructions stored in the storage medium and may execute the instruction. This enables the machine to operate to perform at least one function based on the invoked at least one instruction. The one or more instructions may include a code generated by a complier or a code executable by an interpreter. The machine-readable storage media may be provided in the form of a non-transitory storage medium. In this case, "non-transitory" merely means that the storage medium is a tangible device and does not include a signal (e.g., electromagnetic wave). The term does not distinguish between the case where data is semi-permanently stored in the storage medium and the case where data is temporarily stored in the storage medium.

According to an embodiment, the method according to various embodiments disclosed in this document may be included in a computer program product and provided. The computer program product may be traded as a product between a seller and a purchaser. The computer program product may be distributed in the form of a machine-readable storage medium (e.g., a compact disc read only memory (CD-ROM)) or may be distributed through an app store (e.g., PlayStore™) or directly between two user devices (e.g., smartphones) or online (e.g., download or upload). In the case of online distribution, at least some of the computer program products may be at least temporarily stored or provisionally generated in a machine-readable storage medium, such as the memory of the server of a manufacturer, the server of an app store, or a relay server.

According to various embodiments, each (e.g., module or program) of the described elements may include a single entity or a plurality of entities, and some of a plurality of entities may be separately disposed in another element. According to various embodiments, one or more elements or operations of the aforementioned elements may be omitted or one or more other elements or operations may be added. Alternatively, or additionally, a plurality of elements (e.g., modules or programs) may be integrated into a single element. In such a case, the integrated element may identically or similarly perform a function performed by a corresponding one of the plurality of elements before at least one function of the plurality of elements is integrated. According to various embodiments, operations performed by a module, a program, or another element may be executed sequentially, in parallel, iteratively, or heuristically, or one or more of the operations may be executed in a different order or may be omitted, or one or more other operations may be added.

What is claimed is:

1. An electronic device comprising:

a haptic module including at least a motor and outputting a tactile signal;

a sound output module including at least one of a speaker and a receiver;

memory storing instructions; and at least one processor operatively connected to the memory, the haptic module and the sound output module, wherein the instructions, when executed by the at least one processor individually or collectively, cause the electronic device to:

obtain audio data and a signal related to reproduction of the audio data, identify whether to generate haptic data based on the audio data, generate haptic data based on the audio data in response to the above identification, post-process the generated haptic data, reproduce the audio data based on the signal related to the reproduction of the audio data through the sound output module, and output the tactile signal based on the post-processed haptic data by controlling the haptic module.

2. The electronic device of claim 1, wherein the instructions, when executed by the at least one processor individually or collectively, cause the electronic device to identify whether to generate the audio data-based haptic data based on a user input, a function of an application being executed simultaneously with the reproduction of the audio data, and at least a portion of the audio data.

3. The electronic device of claim 1, wherein the haptic data is pulse code modulation (PCM) based data.

4. The electronic device of claim 1, wherein the instructions, when executed by the at least one processor individually or collectively, cause the electronic device to identify whether the obtained audio data includes the haptic data based on at least a portion of audio data and, in the case that the audio data includes the haptic data, output the tactile signal based on the haptic data included in the audio data.

5. The electronic device of claim 1, wherein the instructions, when executed by the at least one processor individually or collectively, cause the electronic device to generate one piece of audio data by integrating the audio data and the generated haptic data.

6. The electronic device of claim 1, wherein the instructions, when executed by the at least one processor individually or collectively, cause the electronic device to analyze at least one of the generated haptic data and the obtained audio data, extract feature information, and post-process the haptic data based on the extracted feature information.

7. The electronic device of claim 6, wherein feature information comprises at least one of waveform, amplitude, frequency, and duration of the haptic data or the audio data, or a combination thereof.

8. The electronic device of claim 1, wherein the instructions, when executed by the at least one processor individually or collectively, cause the electronic device to extract feature information of the audio data and generate the haptic data based on the extracted feature information.

9. The electronic device of claim 8, wherein feature information comprises at least one of waveform, amplitude, frequency, and duration of the audio data.

10. The electronic device of claim 1, wherein the instructions, when executed by the at least one processor individually or collectively, cause the electronic device to, in the case of obtaining a plurality of pieces of audio data and reproducing the plurality of pieces of audio data simultaneously, identify at least a portion of the audio data to generate the audio data-based haptic data among the plurality of pieces of audio data, and generate the haptic data based on at least a portion of the identified data.

11. A method for an electronic device to provide an output of a tactile signal, the method comprising:

obtaining audio data and a signal related to audio data reproduction;

identifying whether to generate haptic data based on the audio data;

generating haptic data based on the audio data in response to the identification;

post-processing the generated haptic data;

reproducing the audio data based on a signal related to the reproduction of the audio data; and outputting the tactile signal based on the post-processed haptic data.

12. The method of claim 11, wherein the identifying whether to generate comprises: identifying whether to generate the audio data-based haptic data based on a user input, a function of an application being executed simultaneously with the reproduction of the audio data, and at least a portion of the audio data.

13. The method of claim 11, wherein the haptic data is pulse code modulation (PCM) based data.

14. The method of claim 11, wherein the identifying whether to generate comprises: identifying whether the obtained audio data includes the haptic data based on at least a portion of the audio data and outputting the tactile signal based on the haptic data included in the audio data, in case that the audio data includes the haptic data.

15. The method of claim 11, wherein the generating the haptic data comprises: generating one piece of audio data by integrating the audio data and the generated haptic data.

16. The method of claim 11, wherein the post-processing comprises:

extracting feature information by analyzing at least one of the generated haptic data and the obtained audio data and post-processing the haptic data based on the extracted feature information.

17. The method of claim 11, wherein the generating the haptic data comprises: extracting feature information of the audio data and generating the haptic data based on the extracted feature information.

18. The method of claim 11, comprising, in case that the obtained audio data includes a plurality of pieces of audio data, an operation of reproducing the plurality of pieces of audio data simultaneously, identifying at least a portion of the audio data to generate the audio data-based haptic data among the plurality of pieces of audio data, and generating the haptic data based on at least a portion of the identified data.

* * * * *